US012678727B2

(12) United States Patent
Daly et al.

(10) Patent No.: US 12,678,727 B2
(45) Date of Patent: Jul. 14, 2026

(54) DIRECT CAPTURE OF CO₂ FROM AIR AND POINT SOURCES

(71) Applicant: EXXONMOBIL TECHNOLOGY AND ENGINEERING COMPANY, Annandale, NJ (US)

(72) Inventors: Kevin B. Daly, Jersey City, NJ (US); Rodrigo F. Blanco Gutierrez, Berkeley Heights, NJ (US); Justin A. Federici, Doylestown, PA (US); Micaela Taborga Claure, Miami, FL (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 322 days.

(21) Appl. No.: 18/449,885

(22) Filed: Aug. 15, 2023

(65) Prior Publication Data

US 2024/0058743 A1 Feb. 22, 2024

Related U.S. Application Data

(60) Provisional application No. 63/398,491, filed on Aug. 16, 2022.

(51) Int. Cl.
B01D 53/04 (2006.01)

(52) U.S. Cl.
CPC .... B01D 53/0462 (2013.01); *B01D 2253/202* (2013.01); *B01D 2257/504* (2013.01);
(Continued)

(58) Field of Classification Search
None
See application file for complete search history.

(56) References Cited

U.S. PATENT DOCUMENTS

| | | | |
|---|---|---|---|
| 9,975,087 | B2 | 5/2018 | Eisenberger |
| 10,239,017 | B2 | 3/2019 | Eisenberger |

(Continued)

OTHER PUBLICATIONS

Kwon et al. (2019, Aminopolymer-impregnated hierarchical silica structures: unexpected equivalent CO2 uptake under simulated air capture and flue gas capture conditions. Chemistry of materials, 31(14), 5229-5237.) (Year: 2019).*

(Continued)

*Primary Examiner* — Gabriel E Gitman
(74) *Attorney, Agent, or Firm* — Shook, Hardy & Bacon L.L.P.

(57) ABSTRACT

Systems and methods are provided for integrating direct air capture of carbon dioxide with capture of carbon dioxide from a point source. The systems and methods can include exposing an adsorbent to a low CO₂ content gas flow (e.g., air) at conditions similar to ambient conditions to perform an initial amount of sorption of CO₂. The initial sorption results in a partially loaded sorbent having a first sorbent loading. The partially loaded sorbent can then be exposed to a flue gas and/or other gas flow that contains a higher CO₂ content. This allows a second sorption step to be performed using a higher CO₂ content gas, resulting in an additionally loaded sorbent having a second (higher) sorbent loading. The sorbed CO₂ can then be desorbed from the sorbent.

18 Claims, 13 Drawing Sheets

(52) U.S. Cl.
CPC .. *B01D 2258/0283* (2013.01); *B01D 2258/06*
(2013.01); *B01D 2259/40043* (2013.01); *B01D*
*2259/4006* (2013.01); *B01D 2259/4009*
(2013.01); *B01D 2259/41* (2013.01); *Y02C*
*20/40* (2020.08); *Y02P 20/151* (2015.11)

(56) References Cited

U.S. PATENT DOCUMENTS

| | | |
|---|---|---|
| 10,279,306 B2 | 5/2019 | Gebald et al. |
| 2017/0028383 A1* | 2/2017 | Limketkai .............. B01D 53/04 |
| 2020/0197861 A1* | 6/2020 | Schlotterbeck ...... B01D 53/261 |
| 2021/0187434 A1 | 6/2021 | Gebald et al. |
| 2022/0062786 A1* | 3/2022 | Boukari ............... B01D 53/002 |
| 2023/0023050 A1* | 1/2023 | Eisenberger ........... B01D 53/06 |

OTHER PUBLICATIONS

Kwon et al., "Aminopolymer-Impregnated Hierarchical Silica Structures: Unexpected Equivalent CO2 Uptake under Simulated Air Capture and Flue Gas Capture Conditions", Chemistry of Materials, 2019, pp. 5229-5237, vol. 31.
Nezam et al., "Chemical Kinetics of the Autoxidation of Poly(ethylenimine) in CO2 Sorbents", ACS Sustainable Chemistry & Engineering 2021 9 (25), 8477-8486.
Michailos Stavros et al., "A performance modelling study of integrating a MEA direct air capture unit with a CCGT absorber", SSRN Electronic Journal, Oct. 23-27, 2022, 9 pages, Lyon, France.
International Search Report and Written Opinion for PCT/US2023/030215, mailed Nov. 17, 2023 (18 pages).

* cited by examiner

DAC only

2 Stage Sorption

DIRECT CAPTURE OF CO₂ FROM AIR AND POINT SOURCES

CROSS-REFERENCE TO RELATED APPLICATION

This Non-Provisional Patent application claims priority to U.S. Provisional Patent Application No. 63/398,491, filed Aug. 16, 2022, and titled "Direct Capture Of Co2 From Air And Point Sources" the entire contents of which is incorporated herein by reference.

FIELD

Systems and methods are provided for direct capture of $CO_2$ from both air and point sources as part of an adsorption cycle.

BACKGROUND

Capture and sequestration of $CO_2$ can contribute to efforts for reducing or minimizing the amount of $CO_2$ introduced into the atmosphere by various commercial, residential, and/or industrial processes. One option is to attempt to capture $CO_2$ as it is generated at various types of point sources. Another option is to attempt to remove $CO_2$ directly from air.

Some of the difficulties with direct air capture are related to the relatively low concentration of $CO_2$ in the atmosphere. Typical $CO_2$ concentrations in air are on the order of 400 volume parts per million (vppm). Due to the relatively low concentration of $CO_2$ in comparison with other air components, achieving a high loading of $CO_2$ at fast adsorption rates in an adsorbent can be difficult, leading to increased material costs. Additionally, the amount of energy used per $CO_2$ molecule captured can also be high, due in part to the relatively low density of $CO_2$ that can be adsorbed in a typical adsorbent based on the low concentration of $CO_2$ in the atmosphere. It would be beneficial to have improved systems and methods for capturing $CO_2$ from air that can reduce or minimize the associated capital costs and/or energy requirements.

U.S. Pat. No. 9,975,087 describes methods for performing direct air capture of $CO_2$ in conjunction with performing $CO_2$ capture on a point source, such as a combustion flue gas from a power plant. A first $CO_2$ capture stage involves performing $CO_2$ capture on the combustion flue gas using a conventional $CO_2$ capture system, such as a capture system based on contacting $CO_2$ with an amine wash containing monoethyl amine. This is used to capture a majority of the $CO_2$ from the combustion flue gas, such as up to 80 vol % of the $CO_2$. The $CO_2$-depleted flue gas is then mixed with air and passed into a high surface area contactor suitable for use in direct air capture that includes a $CO_2$ adsorbent, such as an amine. Because the $CO_2$-depleted flue gas is still higher in $CO_2$ concentration than air, the resulting mixture is enriched in $CO_2$ relative to air alone. This enriched mixture is then used as the input flow in a direct air capture device.

U.S. Pat. No. 10,239,017 describes a system and method for carbon dioxide capture and sequestration.

U.S. Pat. No. 10,279,306 describes a steam assisted vacuum desorption process for carbon dioxide capture. The method includes contacting a sorbent in a chamber with air under ambient conditions. After contact, the pressure in the chamber is reduced to below ambient and the sorbent is heated to a temperature of 80° C.-130° C., in part by using a substantial excess of steam. The sorbent is then cooled and the chamber is re-pressurized.

U.S. Patent Application Publication 2021/0187434 describes a process for carbon dioxide capture. Temperature during the process is managed at least in part by using associated heat storage devices.

A journal article by Kwon, et al., titled "Aminopolymer-impregnated Hierarchical Silica structures: Unexpected Equivalent $CO_2$ Uptake under Simulated Air Capture and Flue Gas Capture Conditions" describes $CO_2$ sorption from air or from flue gas streams. (Kwon et al., Chem. Mater. 2019, 31, 14, 5229-5237 (2019)).

A journal article by Nezam, et al., titled "Chemical Kinetics of the Autoxidation of Poly(ethylenimine) in $CO_2$ Sorbents" describes amine oxidation rates at elevated temperatures in the presence of gas phase $O_2$. (Nezam et al., ACS Sustainable Chem. Eng. 2021, 9, 25, 8477-8486 (2021)).

SUMMARY

In various aspects, a method of sorbing $CO_2$ is provided. The method includes exposing a first gas flow containing 15 vol % to 25 vol % $O_2$ and 100 vppm to 800 vppm $CO_2$ to one or more amine sorbents in a sorbent environment at a first temperature of 10° C. to 35° C. to form one or more partially loaded amine sorbents having a first sorbent loading of $CO_2$ sorbed during the exposing the first gas flow. Air is an example of a first gas flow. The method further includes exposing a second gas flow containing 1.0 vol % to 20 vol % $CO_2$ and a second temperature higher than the first temperature to the one or more partially loaded amine sorbents in the sorbent environment to form one or more additionally loaded amine sorbents having a second sorbent loading of $CO_2$ sorbed during the exposing the second gas flow, a ratio of the second sorbent loading to the first sorbent loading being 0.02 or more. A combustion flue gas is an example of a second gas flow. The method further includes passing a purge gas flow through the sorbent environment. Steam is an example of a purge gas flow. Additionally, the method includes heating the sorbent environment to a temperature of 85° C. or higher to desorb at least a portion of the $CO_2$ from the one or more additionally loaded amine sorbents.

DETAILED DESCRIPTION

Figure 1:
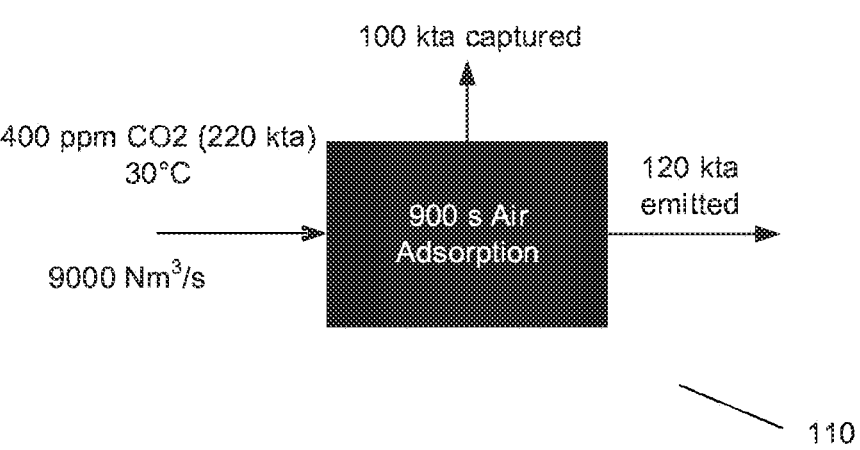
FIG. 1 illustrates general results from modeling of a direct air capture process and a two step sorption process.
Figure 1:
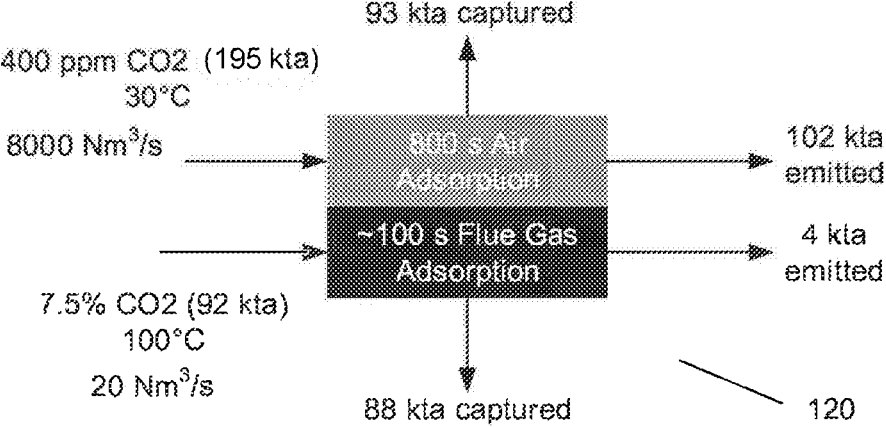

All numerical values within the detailed description and the claims herein are modified by "about" or "approximately" the indicated value, and take into account experimental error and variations that would be expected by a person having ordinary skill in the art.

Overview

In various aspects, systems and methods are provided for integrating direct air capture of carbon dioxide with capture of carbon dioxide from a point source. The systems and methods can include exposing an adsorbent to air at conditions similar to ambient conditions to perform an initial amount of sorption of $CO_2$. The initial sorption results in a partially loaded sorbent having a first sorbent loading. The partially loaded sorbent can then be exposed to a flue gas and/or other gas flow that contains a higher $CO_2$ content, such as a $CO_2$ content of 1.0 vol % or more. This allows a second sorption step to be performed using a higher $CO_2$ content gas, resulting in an additionally loaded sorbent having a second (higher) sorbent loading. In some aspects, the second sorption step can be continued until breakthrough of $CO_2$ is detected. The sorbed $CO_2$ can then be desorbed from the sorbent. In some aspects, the second sorption step can be performed without lowering the pressure in the sorbent environment and/or can be performed after lowering the pressure by a reduced or minimized amount. In some aspects, the second sorption step can be performed without performing additional heating in the sorbent environment prior to the beginning of the second sorption step and/or can be performed after only a reduced or minimized amount of heating. In various aspects, one or more benefits can be achieved while reducing or minimizing degradation of the sorbent material during the sorption cycle.

By combining an initial sorption step (e.g., a direct air capture step) with a second sorption step (e.g., a step for sorption from a combustion flue gas), a sorption process is provided that can allow for capture of greater than 100 vol % of the $CO_2$ generated by the source of the flue gas used for the second sorption step while also providing substantially increased productivity ($CO_2$ captured per gram of sorbent per unit time) relative to the productivity of a conventional direct air capture process.

In this discussion, several types of loadings for a sorbent are discussed. One way of specifying a loading for a sorbent can be based on millimoles of $CO_2$ per gram of aminopolymer in the sorbent.

In this discussion, unless specified otherwise, all loadings described herein are defined as relative loadings. In other words, unless specified otherwise, all loadings described herein are loadings in addition to any $CO_2$ present prior to the start of a given sorption step. Thus, a reference herein to a loading without other specification corresponds to a relative loading. For example, for first or initial loadings described herein, unless otherwise specified, the initial loading represents the amount of $CO_2$ added during the initial sorption step. This is in addition to any $CO_2$ that may have already been sorbed on the sorbent prior to the start of the first or initial sorption step. Similarly, for the second sorption step, loadings described herein correspond to $CO_2$ that is sorbed in addition to any $CO_2$ that is present after the initial sorption step.

An alternative to specifying a relative loading for a sorbent is to specify an absolute loading. An absolute loading is defined as the total amount of sorbed $CO_2$ on a sorbent regardless of when the $CO_2$ was sorbed. In this discussion, the term "absolute loading" will be used to refer to the total $CO_2$ present on a sorbent, and does not correspond to a relative loading. Such an absolute loading could be characterized, for example, by exposing a sorbent with a $CO_2$ loading to conditions sufficient for completely removing the $CO_2$. Such conditions for complete removal can be selected based on the isotherm for the sorbent.

In this discussion, an equilibrium loading is defined as the absolute loading that can be achieved when equilibrium is reached based on the temperature and partial pressure of $CO_2$ in the sorbent environment. This corresponds to a maximum loading for the sorbent at a temperature and pressure. In this discussion, the term "equilibrium loading" will be used to distinguish this type of absolute loading value from relative loadings.

In some aspects, this initial sorption can be performed for a sufficient time to approach an equilibrium loading based on the temperature of the sorbent and the $CO_2$ concentration in air. In other aspects, the initial sorption can be stopped farther from equilibrium loading. In such aspects, the end point for the initial sorption can be selected based on efficiency considerations. For example, one of the difficulties with fully loading a sorbent with $CO_2$ during a direct air capture process is that the rate of sorption decreases as the loading approaches the equilibrium loading. One option can be to end the initial sorption step when the rate of sorption falls below a target amount. This target amount can be an absolute sorption rate, a sorption rate corresponding to a percentage of the sorption rate at the beginning of the initial sorption, a sorption rate corresponding to a percentage of the sorption rate for a fully desorbed sorbent, or another convenient target rate. Still another option can be to perform the initial sorption step for a period of time. For example, selecting a fixed time can serve as a proxy for selecting a target rate of sorption without requiring in-situ detection of the sorption rate.

Due in part to the relatively low rate of sorption during a direct air capture process, in some aspects after the first step, the temperature of the sorbent and/or the sorbent environment can be 35° C. or less, or 30° C. or less, or 25° C. or less, such as down to 0° C. or possibly still lower.

By using a second sorption step that provides a combination of a) increased $CO_2$ concentration in the gas phase, and b) increased temperature in the sorbent environment during the second sorption step, a higher equilibrium loading can be achieved. Additionally, for amine-type sorbents, it has been discovered that this additional equilibrium loading can be accessed on a fast kinetic time scale, so that a substantial portion of this additional equilibrium loading during the second sorption step can be achieved via rapid uptake of $CO_2$ from a high concentration (1.0 vol % to 20 vol %, or 3.0 vol % to 15 vol %) $CO_2$-containing stream. In some aspects, additional heat can be transferred to the sorbent environment from the input gas flow for the second sorption step by using an input gas flow that is at a temperature above ambient, such as at a temperature of 40° C. to 100° C. Additionally or alternately, additional heat can be provided to the sorbent environment based on rapid uptake of $CO_2$ and associated heat of adsorption when the sorbent is exposed to the higher concentration of $CO_2$ in the input gas flow for the second sorption step. At high concentrations of $CO_2$, the input gas flow has low thermal mass (mass flow rate*heat capacity) per mole of $CO_2$, so more of the $CO_2$ heat of adsorption is transferred to the sorbent instead of leaving with the exhaust gas. By contrast, air has a relatively high thermal mass per mol of $CO_2$, so substantially all of the $CO_2$ heat of adsorption leaves as ambient temperature waste heat in the exhaust gas. In addition to increasing the loading, the additional heat transfer to the sorbent can also reduce the amount of heat required to subsequently desorb the $CO_2$ during a desorption step.

In some aspects, a sorption cycle is provided using a) an initial sorption step using an input gas flow having a $CO_2$ concentration of 2000 vppm or less (or 1000 vppm or less, or 500 vppm or less, such as down to 100 vppm or possibly still lower) and a sorbent temperature and/or sorbent environment temperature of 35° C. or less, followed by b) a second sorption step using an input gas flow having a $CO_2$ concentration of 1.0 wt % or more, or 3.0 vol % or more, or 5.0 vol % or more, such as up to 20 vol % or possibly still higher. Thus, a ratio of the $CO_2$ concentrations in the input flow for the second step versus the input flow for the first step can be 5.0 or more (i.e., 5 to 1 or more), or 10 or more, or 20 or more, or 100 or more, such as up to 10,000 or possibly still higher. In some aspects, the pressure in the sorbent environment at the beginning of the second sorption step can be 50 kPa-a or higher, or 70 kPa-a or higher, or 90 kPa-a or higher, such as up to 500 kPa-a or possibly still higher. Additionally or alternately, the temperature of the sorbent and/or the sorbent environment at the end of the second sorption step can be greater than the temperature at the end of the initial sorption step by 10° C. or more, or 20° C. or more, or 40° C. or more, such as up to 60° C. or possibly still higher. In some aspects, the temperature of the sorbent and/or the sorbent environment at the end of the second sorption step can be 40° C. to 80° C., or 50° C. to 80° C., or 60° C. to 80° C., or 40° C. to 70° C., or 50° C. to 70° C., or 40° C. to 60° C. Additionally or alternately, the temperature of the sorbent and/or the sorbent environment at the beginning of the second sorption step can be 35° C. or less, or 30° C. or less, or 25° C. or less, such as down to 0° C. or possibly still lower.

In some aspects, the input gas flow for the second sorption step can have a higher temperature than the temperature of the sorbent and/or the sorbent environment at the beginning of the second sorption step. In such aspects, the temperature of the input gas flow for the second sorption step can be 40° C. or more, or 50° C. or more, such as up to 70° C. or possibly still higher. In other aspects, the temperature of the input gas flow for the second sorption step can be 0° C. to 50° C., or 0° C. to 40° C., or 0° C. to 30° C., or 0° C. to 20° C. In this type of aspect, the relatively low temperature of the input gas flow can reduce or minimize the amount of heating of the sorbent that occurs based on heat transfer from the input gas flow to the sorbent. Instead, the heating of the sorbent can be primarily performed based on heat generated as $CO_2$ is sorbed by the sorbent material. In some aspects, the temperature of the input gas flow for the second sorption step can be lower than the temperature of the sorbent and/or the sorbent environment at the end of the second sorption step. For example, the temperature of the input gas flow can be lower than the temperature of the sorbent and/or the sorbent environment at the end of the second sorption step by 10° C. or more, or 20° C. or more, such as up to 80° C. or possibly still more. It is noted that the temperature of the input gas flow for the second sorption step can potentially vary during the second sorption step. When comparing the temperature of the input gas flow with the temperature of the sorbent and/or sorbent environment at the end of the second sorption step, the peak temperature of the input gas flow during the second sorption step can be used.

One of the benefits of direct air capture processes is that the net $CO_2$ sorbed by the process can potentially be greater than the $CO_2$ generated by the process. In other words, the $CO_2$ capture can be greater than the $CO_2$ generated in producing the energy to perform the direct air capture process. However, attempting to capture $CO_2$ from air (i.e., direct air capture) can present a variety of challenges. For direct air capture, many of the challenges can be related to the cost per molecule of $CO_2$ that is captured by a sorbent. One example of such costs is the equipment/capital cost required for direct air capture. A typical $CO_2$ concentration in air is roughly 400 vppm. Due to the low concentration of $CO_2$ in air, current sorbents used for $CO_2$ sorption/desorption cycles can have a limited equilibrium loading. Additionally, the mass transfer rate for sorbing $CO_2$ from air is slow, due in part to the low $CO_2$ concentration and the practical limitations for needing to perform direct air capture at temperatures that are substantially similar to the ambient temperature. As a result, for sorbents used in direct air capture, the productivity of the sorbent is typically low, resulting in the need to have increased capital investment in order to achieve a target amount of $CO_2$ removal.

The energy cost per molecule of $CO_2$ captured by a sorbent is also relatively high for conventional direct air capture processes. After using a sorbent to sorb $CO_2$, a regeneration step is needed to desorb the $CO_2$ in order to complete the sorption/desorption cycle. A typical process for swinging from sorption to desorption can require heating the sorbent to a temperature of 85° C. or higher. Even with efforts to recapture heat via heat exchange, this large temperature swing relative to a low $CO_2$ loading can result in a high consumption of energy per $CO_2$ molecule that is captured.

Still another difficulty with direct air capture is avoiding degradation of the sorbent. For sorbents based on aminopolymers (such as a supported aminopolymer sorbent), exposing the sorbent to elevated temperatures in the presence of oxygen concentrations/partial pressures similar to those present in air can result in degradation of the sorbent over time. For example, one study observed that the amine oxidation rate at temperatures of 125-150 C, as measured by differential scanning calorimetry, can be fit to a rate law of the form shown in Equation 1.

$$\frac{r(T, O_2)}{r(T_{ref}, O_{2,ref})} = \exp\left[\frac{E_a}{R}\left(\frac{1}{T_{ref}} - \frac{1}{T}\right)\right]\left(\frac{O_2}{O_{2,ref}}\right)^x \tag{1}$$

In Equation (1), $T_{ref}$ and $O_{2,ref}$ are arbitrary reference temperatures (K) and gas-phase oxygen concentrations. The activation energy, $E_a$, and reaction order, x, were measured to be 105±10 kJ/mol and 0.5-0.7, respectively, depending on extent of oxidation. As an example, raising the temperature from 125° C. to 150° C. would increase the oxidation rate by ~6.5× if the activation energy is 105 kJ/mol. On the other hand, reducing the $O_2$ concentration by 80% would reduce the oxidation rate by 50-70%, based on a reaction order of 0.5-0.7. Therefore, exposing the sorbent to steam after finishing a sorption step can run the risk of increasing the temperature of the sorbent too fast relative to the decrease in oxygen concentration within the sorbent. Thus, in order to avoid exposing a sorbent to combinations of temperature and oxygen that can result in sorbent degradation, a vacuum purge step is often included as part of a sorption/desorption cycle during direct air capture. Adding such a vacuum purge step can further increase the energy and capital cost for $CO_2$ capture process.

Based on the above, direct air capture processes can allow for net removal of $CO_2$, but this net removal of $CO_2$ is accompanied by low sorbent productivity and high costs per molecule of removed $CO_2$. It is noted that these advantages and difficulties are in direct contrast to the advantages and difficulties for a typical process for sorption of $CO_2$ from a combustion flue gas stream and/or other type of point source(s) of $CO_2$. Due to the higher concentration of $CO_2$ in a typical flue gas from a point source, the productivity of $CO_2$ capture processes is higher. This also reduced the cost per molecule of $CO_2$ that is captured. However, by definition, when performing $CO_2$ capture on a flue gas stream, the maximum $CO_2$ that can be captured is the $CO_2$ content of that stream. Even if the energy used for performing the $CO_2$ capture process is provided by the point source generating the flue gas stream, the best possible idealized performance for capture of $CO_2$ from a flue gas stream is to capture all of the $CO_2$ generated, so that there is no net $CO_2$ emission. Thus, net removal of $CO_2$ from the atmosphere cannot occur. As practical matter, conventional processes for $CO_2$ capture from a flue gas stream typically operate at $CO_2$ capture efficiencies of 90% to 95%, so that some net $CO_2$ emission still occurs.

Although direct air capture and $CO_2$ capture from point sources (e.g., capture from a flue gas) are operated in different manners, the underlying sorbent used for both types of $CO_2$ sorption/desorption processes can be the same. For example, aminopolymers can be used as the sorbent for both types of processes. However, even though similar sorbents can be used in both types of processes, there would be significant practical problems in attempting to combine direct air capture with $CO_2$ capture from a point source.

Based on conventional understanding, there would be at least two difficulties with attempting to combine a direct air capture process with $CO_2$ capture from a point source. First, when using a solid supported sorbent such as an aminopolymer, in order to facilitate rapid uptake of $CO_2$ from the point source and/or to increase the sorption capacity of the sorbent to accommodate additional sorption of $CO_2$, it would conventionally be expected that the sorbent material would need to be heated prior to introducing the $CO_2$-containing stream from the point source, especially under dry conditions and/or if the sorbent loading is already close to the equilibrium loading value at typical air temperatures (10° C.-35° C.). It is noted that any breakthrough of $CO_2$ during capture from a point source can rapidly eliminate the benefit of performing sequential direct air capture followed by capture from a flue gas/point source. Under conventional understanding, heating would be necessary prior to introducing the flue gas/point source stream in order to avoid $CO_2$ breakthrough during the initial exposure of the flue gas to the sorbent. It is noted that the heating could potentially be avoided with careful timing for the capture step, although this would also result in a substantial reduction in the available capacity of the sorbent due to absence of the heating step.

The heating required prior to introducing a flue gas presents a second difficulty that would be expected for any attempt to combine direct air capture with $CO_2$ capture from a point source. As noted above, during a typical direct air capture process, a vacuum purge is included prior to using steam to desorb $CO_2$. This vacuum purge reduces or minimizes the potential for exposing the sorbent to a sufficiently high concentration of $O_2$ at a sufficiently high temperature to cause degradation. Based on conventional understanding, a similar vacuum purge would be needed prior to exposing a $CO_2$-containing flue gas to the sorbent.

It is noted that another option for attempting to combine direct air capture and $CO_2$ capture from a flue gas is to mix the input flows. Conventionally, some efforts have been made to mix air with $CO_2$-containing streams from point sources, but this primarily has the effect of diluting a higher $CO_2$ content stream with a lower content stream. Such mixing of air with streams from point sources reduces the driving force for both mass transfer and adsorption compared to the undiluted point source, thereby reducing capture rate and sorption compared to standalone point source capture systems.

In contrast to the conventional expectation, it has been discovered that by using sequential sorption steps, where direct air capture is performed followed by capture from a point source flow, direct air capture and point source capture of $CO_2$ can be combined in a manner that mitigates the difficulties present in both types of capture processes. In various aspects, a direct air capture sorption step can be integrated with a point source capture step without diluting the higher concentration flow. Instead, a sorbent can first be exposed to air to perform direct air capture. The sorbent can then be exposed to a second $CO_2$-containing gas flow derived from a point source for further $CO_2$ capture. This integration is enabled in part by heating the sorbent while exposing the sorbent to the second $CO_2$-containing gas flow. Increasing the temperature of the sorbent during exposure to the second gas flow can allow for rapid kinetic sorption of $CO_2$ from the second gas flow, so that a substantial increase in $CO_2$ loading can be achieved using a relatively short time scale second sorption step. It is noted that the temperature increase can be performed during the second sorption step. Heating of the sorbent prior to starting the second sorption step is not required.

In some aspects, combining a direct air capture process with a point source capture process using the same sorbent can allow for recovery of the equivalent of 100 vol % or more of the $CO_2$ generated by a point source. In such aspects, performing an initial direct air capture step can result in a first or initial loading of $CO_2$ on a sorbent. After achieving the initial loading of $CO_2$, the sorbent can be exposed to a second gas flow derived from a point source. This can allow for additional sorption of $CO_2$ to form an additionally loaded sorbent.

There are several options for characterizing the amount of $CO_2$ that is sorbed during the first sorption step and the second sorption step. One option can be to characterize the total or absolute amount of $CO_2$ sorbed on the sorbent at the end of the first step and the end of the second step. Due in part to having a higher $CO_2$ concentration in the second gas flow, the total or absolute $CO_2$ loading of the sorbent at the conditions for the second gas flow (i.e., the second sorbent loading) can be greater than the first or initial loading by 0.1 times to 20 times the first or initial loading. In other words, a ratio of the total or absolute $CO_2$ loading at the end of the second sorption step relative to the total or absolute $CO_2$ loading at the end of the initial sorption step can be 1.1 to 21. In various aspects, this ratio can be 1.1 to 21, or 1.1 to 10, or 1.1 to 5.0, or 2.0 to 21, or 2.0 to 10, or 2.0 to 5.0, or 4.0 to 21, or 4.0 to 10, or 8.0 to 21.

Another option can be to characterize the relative amounts of $CO_2$ sorbed during the initial sorption step and the second sorption step. This option excludes consideration of any $CO_2$ already present on the sorbent prior to the start of the initial sorption step. For this type of option, the amount of $CO_2$ sorbed during the second sorption step could be smaller than the amount sorbed during the initial sorption step. The relative amount of sorption can depend, for example, on the length of the sorption steps. For the relative sorption amounts, a ratio is defined based on the amount of $CO_2$ sorbed during the second sorption step versus the amount of $CO_2$ sorbed during the initial sorption step. In various aspects, the relative ratio of the $CO_2$ sorbed during the second step versus the $CO_2$ sorbed during the first step can be 0.02 to 40, or 0.02 to 20, or 0.02 to 10, or 0.02 to 5.0, or 0.1 to 40, or 0.1 to 20, or 0.1 to 10, or 0.1 to 5.0, or 0.5 to 20, or 0.5 to 10, or 0.5 to 5.0, or 1.0 to 40, or 1.0 to 20, or 1.0 to 10, or 1.0 to 5.0, or 20 to 20, or 2.0 to 10. It is noted that ratio values of less than 1.0 mean that more $CO_2$ is sorbed during the direct air capture portion of the cycle (the initial sorption step) relative to the amount sorbed during the second sorption sep.

Additionally or alternately, in some aspects, a direct air capture-type process can be combined sequentially with $CO_2$ capture from a point source in a manner that improves the productivity of the sorbent material. In this type of aspect, the initial sorption step (e.g., direct air capture step) can be performed to take advantage of the initial rapid increase in $CO_2$ loading that occurs at the beginning of a direct air capture process. Based on the temperature of the direct air capture process, this can correspond to a $CO_2$ loading that is 10% to 80% of the equilibrium $CO_2$ loading for the sorbent at the sorbent temperature at the end of the initial sorption step, or 10% to 50%, or 10% to 30%, or 30% to 80%, or 30% to 50%, or 50% to 80%. It is noted that achieving this partial loading may correspond to stopping the initial sorption step prior to the end of rapid sorption part of the sorption curve at the sorbent temperature, or the partial loading may be achieved by performing the initial sorption step for a time period that extends beyond the rapid sorption part of the sorption curve. By achieving only a limited partial loading, the time period for the initial sorption step can be reduced or minimized. The partially loaded sorbent can then be exposed to the flue gas (and/or other $CO_2$-containing stream from a point source) to achieve additional rapid loading of the sorbent. By limiting the time for the initial sorption step, the benefits of using an initial direct air capture step can be at least partially achieved while substantially reducing the total cycle time for the sorption process. Thus, the productivity of the sorbent can be further increased.

In various aspects, the sorbent for performing a two step capture process can correspond to a sorbent that includes one or more amine sorbents. In some aspects, an amine sorbent can correspond to an aminopolymer. In this discussion, an "aminopolymer" is any mixture of oligomerized (including polymerized) molecules that contain one or more covalently bonded amine groups (primary, secondary, or tertiary amines). Optionally but preferably, for a polymer formed from a plurality of different types of repeating units (such as a block co-polymer, a random co-polymer, or another polymer formed from a plurality of types of mono-mers), 10 wt % or more of the polymer can be derived from repeat units that include a functional group that results in a covalently bonded amine group in the polymer, or 50 wt % or more, such as up to having substantially all of the polymer being derived from repeat units that include a functional group that results in a covalently bonded amine group in the polymer. Examples of aminopolymers include, but are not limited to, polyethyleneimine, polypropyleneimine, and 3-aminopropyltrimethoxysilane. In some aspects, an ami-nopolymer can be introduced and/or incorporated into a sorbent structure by depositing the aminopolymer on one or more substrates designed to increase surface area in contact with air, either at the microscopic level (e.g. silica, alumina, titania), macroscopic level (e.g., monoliths, spherical par-ticles), or both.

In some aspects, the $CO_2$ loading after the direct air capture step can correspond to a first sorbent loading of 0.2 mmol-$CO_2$/g-aminopolymer to 6.5 mmol-$CO_2$/g-aminopo-lymer, or 0.2 mmol-$CO_2$/g-aminopolymer to 4.5 mmol-$CO_2$/g-aminopolymer, or 0.2 mmol-$CO_2$/g-aminopolymer to 2.5 mmol-$CO_2$/g-aminopolymer, or 0.2 mmol-$CO_2$/g-aminopo-lymer to 1.5 mmol-$CO_2$/g-aminopolymer, or 0.5 mmol-$CO_2$/g-aminopolymer to 6.5 mmol-$CO_2$/g-aminopolymer, or 0.5 mmol-$CO_2$/g-aminopolymer to 4.5 mmol-$CO_2$/g-aminopo-lymer, or 0.5 mmol-$CO_2$/g-aminopolymer to 2.5 mmol-$CO_2$/g-aminopolymer, or 0.5 mmol-$CO_2$/g-aminopolymer to 1.5 mmol-$CO_2$/g-aminopolymer, or 1.5 mmol-$CO_2$/g-aminopo-lymer to 6.5 mmol-$CO_2$/g-aminopolymer, or 1.5 mmol-$CO_2$/g-aminopolymer to 4.5 mmol-$CO_2$/g-aminopolymer, or 1.5 mmol-$CO_2$/g-aminopolymer to 2.5 mmol-$CO_2$/g-aminopo-lymer, or 2.5 mmol-$CO_2$/g-aminopolymer to 6.5 mmol-$CO_2$/g-aminopolymer, or 2.5 mmol-$CO_2$/g-aminopolymer to 4.5 mmol-$CO_2$/g-aminopolymer, or 3.5 mmol-$CO_2$/g-aminopo-lymer to 6.5 mmol-$CO_2$/g-aminopolymer, or 4.5 mmol-$CO_2$/g-aminopolymer to 6.5 mmol-$CO_2$/g-aminopolymer.

In some aspects, after exposing the one or more amine sorbents to the second gas flow, the additionally loaded sorbents can have a second sorbent loading of 0.2 mmol-$CO_2$/g-aminopolymer to 7.0 mmol-$CO_2$/g-aminopolymer, or 1.0 mmol-$CO_2$/g-aminopolymer to 7.0 mmol-$CO_2$/g-ami-nopolymer, or 2.0 mmol-$CO_2$/g-aminopolymer to 7.0 mmol-$CO_2$/g-aminopolymer, or 3.0 mmol-$CO_2$/g-aminopolymer to 7.0 mmol-$CO_2$/g-aminopolymer, or 5.0 mmol-$CO_2$/g-ami-nopolymer to 7.0 mmol-$CO_2$/g-aminopolymer, or 0.2 mmol-$CO_2$/g-aminopolymer to 6.0 mmol-$CO_2$/g-aminopolymer, or 1.0 mmol-$CO_2$/g-aminopolymer to 6.0 mmol-$CO_2$/g-ami-nopolymer, or 2.0 mmol-$CO_2$/g-aminopolymer to 6.0 mmol-$CO_2$/g-aminopolymer, or 3.0 mmol-$CO_2$/g-aminopolymer to 6.0 mmol-$CO_2$/g-aminopolymer, or 1.0 mmol-$CO_2$/g-ami-nopolymer to 5.0 mmol-$CO_2$/g-aminopolymer, or 2.0 mmol-$CO_2$/g-aminopolymer to 5.0 mmol-$CO_2$/g-aminopolymer, or 1.0 mmol-$CO_2$/g-aminopolymer to 4.0 mmol-$CO_2$/g-ami-nopolymer, or 1.0 mmol-$CO_2$/g-aminopolymer to 3.0 mmol-$CO_2$/g-aminopolymer, or 1.0 mmol-$CO_2$/g-aminopolymer to 5.0 mmol-$CO_2$/g-aminopolymer, or 1.0 mmol-$CO_2$/g-ami-nopolymer to 3.0 mmol-$CO_2$/g-aminopolymer. In various aspects, the second sorbent loading after the second gas flow can be greater than the first sorbent loading after the direct air capture step by 0.2 mmol-$CO_2$/g-aminopolymer or more, or 0.5 mmol-$CO_2$/g-aminopolymer or more, or 1.0 mmol-$CO_2$/g-aminopolymer or more, or 2.0 mmol-$CO_2$/g-ami-nopolymer or more, or 4.0 mmol-$CO_2$/g-aminopolymer or more, such as up to 7.0 mmol-$CO_2$/g-aminopolymer or possibly still higher.

The flow conditions during this second sorption process can be selected to allow for capture of 95 vol % or more of the $CO_2$ from the gas flow until breakthrough occurs, or 98 vol % or more, such as up to 100 vol %. In some aspects, when breakthrough is detected, the second gas flow is stopped. In other aspects, the second gas flow can be stopped prior to breakthrough in order to minimize any loss of the benefit from performing the initial direct air capture process. Due to the relatively high capture rate prior to breakthrough, the amount of $CO_2$ exhausted during the second sorption step can be small relative to the amount of $CO_2$ sorbed during the initial direct air capture sorption step. For example, the amount of $CO_2$ exhausted from the sorbent environment during the second sorption step can correspond to 15 vol % or less of the $CO_2$ exposed to the sorbent during the first sorption step, or 10 vol % or less, or 5.0 vol % or less, or 3.0 vol % or less, such as down to substantially no $CO_2$ being exhausted from the sorbent environment during the second sorption step. As a result, the net $CO_2$ sorbed by the sorbent can be greater than 100 vol % of the $CO_2$ in the second gas flow derived from the point source. By using a plurality of sorbents in parallel, the parallel sorbents can be used to first perform direct air capture and then capture $CO_2$ from the second gas flow. This can allow for a continuous process that can capture the equivalent of 100 vol % or more of the $CO_2$ in the second gas flow derived from the point source.

Performing sequential sorption steps corresponding to direct air capture followed by capture from a point source can also reduce or minimize difficulties associated with the direct air capture process. With regard to energy consumption, the higher $CO_2$ loadings achieved during the second sorption step can reduce or minimize energy requirements in two ways. First, the higher sorbent loading means that any energy used to raise the temperature during the desorption step is used to desorb a substantially larger amount of $CO_2$. Second, the higher loading during second sorption step can itself provide additional heat. Due in part to the low thermal mass of the exhaust gas during the second sorption step, the heat released as $CO_2$ is sorbed by the sorbent can be predominately transferred to the sorbent instead of the exhaust gas. It is noted that still further efficiencies may be achieved if the second gas stream derived from the point source is at a temperature above ambient due to prior processing. For example, the second gas stream can be at a temperature of 40° C. to 100° C. prior to being introduced into the sorption process.

Performing sequential sorption steps can also assist with managing the combination of temperature and oxygen content within the sorbent. In some aspects, the second gas stream containing $CO_2$ can correspond to a stream that is derived from a combustion flue gas. In such aspects, the oxygen content of the second gas stream can be low, and possibly close to zero. When the second gas stream corresponds to an oxygen-depleted stream (such as a stream derived from a suitable combustion flue gas), the second gas stream can optionally be exposed to the sorbent without first using a vacuum purge to reduce or minimize the oxygen content of the environment surrounding the sorbent. In such optional aspects, the second gas stream can be used to displace the air in the environment surrounding the sorbent while reducing or minimizing the potential for having combinations of temperature and oxygen concentration at one or more locations in the sorbent environment that might result in increased degradation of the sorbent. In various aspects, the second gas stream can displace the air while reducing, minimizing, or avoiding locations having a combination of both a) a temperature of 70° C. or more, or 80° C. or more, or 90° C. or more, or 100° C. or more, such as up to 120° C. or possibly still higher and b) an oxygen ($O_2$) partial pressure of 0.1 kPa or higher, or 1.0 kPa or higher, or 2.0 kPa or higher, or 5.0 kPa or higher, or kPa or higher, such as up to 25 kPa or possibly still higher. Without being bound by any particular theory, it is noted that steam is typically used as a purge gas. When steam is used as a purge gas, this can result in rapid heating of a sorbent to temperatures approaching 100° C. due to steam condensation on the sorbent, thus creating the potential that oxygen may not be sufficiently purged from all portions of a sorbent prior to the temperature reaching 70° C. or higher, or 80° C. or higher, or 90° C. or higher, or 100° C. or higher. By contrast, a second gas stream derived from a combustion flue gas can be exposed to the sorbent at temperatures at or below 100° C. while having a reduced or minimized concern that condensation of steam will occur. The lower temperature and water partial pressure of the flue gas reduces the rate of heating of the sorbent, thus providing additional time for removal of oxygen to a desired level throughout a sorbent structure. In other aspects, pressure in the sorbent environment can be reduced prior to and/or during the introduction of the gas flow, to further facilitate removal of oxygen from the sorbent environment.

It is noted that the $O_2$ concentration in the sorbent environment can be reduced relatively quickly by a purge gas in the form of either steam or a flue gas. It has been discovered that the time scale for heating by steam condensation is sufficiently more rapid than heating due to $CO_2$ sorption from a flue gas that in some aspects, introduction of a flue gas without a prior vacuum purge step can be performed, even though introduction of steam without a prior vacuum purge would result in sorbent degradation under otherwise similar conditions.

Additionally, in some optional aspects, such as aspects where the first sorption step is performed under dry conditions, increasing the temperature of the sorbent during exposure of the sorbent to the second gas flow can unlock additional capacity for fast sorption of $CO_2$, even though the sorbent already has a partial loading of $CO_2$ that was achieved during the initial sorption step at a lower temperature and input $CO_2$ concentration. However, as the humidity of the air stream used during the first step is increased, the amount of additional capacity that can be unlocked by the second gas flow is reduced or minimized. It is noted that the ability to increase the sorption capacity of a sorbent under sufficiently dry conditions by increasing the temperature is an unusual feature of amine-based sorbents. Under a traditional Langmuir adsorption model, the maximum capacity of a sorbent is independent of temperature.

Sorbent Structure and Sorbent Environment

In various aspects, an integrated process for combining direct air capture with a process for capture of $CO_2$ from a point source can be performed using a sorbent structure and/or sorbent environment that is suitable for performing a direct air capture process. After performing an initial direct air capture process to provide an initial loading of $CO_2$ on a sorbent, a second sorption step can be performed using a second gas stream derived from a point source of $CO_2$.

In some aspects, the sorbent used for performing the sequential $CO_2$ capture processes can correspond to a supported amine sorbent. One way to provide a supported amine sorbent is to support an amine on a monolith. The monolith can be made of a structural material, such as silica, alumina, titania, a ceramic, or another convenient material. The monolith can preferably have a high density of flow channels or cells, such as 20-2000 channels per square inch, or 100-2000 channels per square inch, or 20-1000 channels per square inch, or 100-1000 channels per square inch. Examples of such monoliths are commercially available, such as the CELCOR® monoliths available from Corning.

Such a monolith can be used to support an amine-based sorbent. The amine sorbent can be supported on the monolith in any convenient manner. One option can be to impregnate a monolith material with an amine sorbent compound and/or polymer. This can allow the amine sorbent to be incorporated onto the surface and/or into the pores of a porous monolith. Another option can be to chemically bond an amine to the surface of the monolith. Still another option can be to form an polymer layer with amine functionality in-situ on the interior surfaces of the monolith channels. Yet another option can be to incorporate an amine sorbent into a support layer that is applied to a monolith, such as by incorporating an amine sorbent into an alumina layer that is deposited on the surfaces of a monolith.

A variety of amines can potentially be used as sorbent materials for $CO_2$ capture. Some amines can correspond to polymers with amine functionality, such as polyethyleneimine and/or polypropyleneimine. Polyethyleneimine, polypropyleneimine, or combinations thereof are examples of amine systems that can be deposited on and/or impregnated into a monolith surface. Another example of an amine is 3-aminopropyltriethoxysilane. For a monolith with suitable amounts of oxygen functionalities available at the monolith surface, this type of amine can be grafted onto the monolith surface.

One or more monoliths of this type can then be placed in a reactor or other vessel to provide a sorbent environment. Any convenient type of sorbent environment for managing a sorption/desorption process can be used. The sorbent environment can be limited in volume to primarily the volume within the sorbent, or additional volume can be present around the sorbent. The volume can include inlets and outlets to allow for gas flow through the sorbent environment. The gas inlets and outlets can further include pumps and/or other mechanisms for managing such gas flows. In some aspects, a plurality of sorbent structures (and corresponding sorbent environments) can be arranged in parallel to allow for continuous processing. This can allow some sorbents to be regenerated while other sorbents are being used for sorption of $CO_2$.

Process Flow for Integration of Direct Air Capture and Capture from a Point Source In various aspects, a direct air capture process and a capture process for a point source can be integrated to provide for improved sorption of $CO_2$. The process can include a plurality of processing steps that provide a sorption/desorption cycle.

In order to illustrate the process, the start of the sorption cycle can be used as a starting point. At the start of the sorption cycle, the sorbent can be in a state that is either substantially free of $CO_2$ or that has a minimum level of $CO_2$ relative to the $CO_2$ loading at other points in time during the sorption/desorption cycle. In some aspects, the absolute loading on the sorbent material at the beginning of a sorption/desorption cycle can be 4.0 mmol-$CO_2$/g-aminopolymer or less, or 3.0 mmol-$CO_2$/g-aminopolymer or less, or 2.0 mmol-$CO_2$/g-aminopolymer or less, or 1.0 mmol-$CO_2$/g-aminopolymer or less, or 0.5 mmol-$CO_2$/g-aminopolymer or less, such as down to having substantially no sorbed $CO_2$ at the start of a sorption/desorption cycle.

Initially, the sorbent can be exposed to air (or another gas similar to air) to allow for capture of $CO_2$ from the air (i.e., direct air capture). The initial sorption of $CO_2$ can be performed at roughly ambient conditions, so that the air and the sorbent do not need to be heated and/or pressurized. The gas in this first sorption step can include a $CO_2$ content of 100-800 volume parts per million (vppm) and an oxygen ($O_2$) content of 15 vol % or more, such as up to 25 vol %. (It is noted that 21 vol % $O_2$ is typical for air.) The sorption of $CO_2$ from air can be facilitated by exposing the sorbent to a flow rate of air corresponding to 2.0 g or less of air per sec per gram of aminopolymer (2.0 g-air/sec per g-aminopolymer) or 1.0 g-air/second per g-aminopolymer, such as down to 0.05 g-air/second per g-aminopolymer or possibly still lower. The sorbent can be exposed to the air for a first sorption time of 1.0 minute to 20 minutes. The temperature of the air can correspond to an ambient temperature, such as a temperature between 0° C. and 35° C., or between 10° C. and 35° C.

After the initial air exposure, the sorbent can be exposed to a second gas flow to perform a second sorption step. The second gas flow can correspond to a gas flow containing 3.0 vol % of $CO_2$ or more. For example, the second gas flow can have a $CO_2$ content of 3.0 vol % to 20 vol %, or 3.0 vol % to 10 vol %, or 5.0 vol % to 20 vol %, or 5.0 vol % to 10 vol %. Depending on the relative lengths of the initial sorption step and the second sorption step, the ratio of the second sorbent loading to the first sorbent loading can vary widely, such as from 0.02 to 40.

With regard to oxygen ($O_2$) content, the second gas flow can have an oxygen content of 10 vol % or less, or 6.0 vol % or less, or 4.0 vol % or less, or 2.0 vol % or less, or 1.0 vol % or less, or 0.1 vol % or less, such as down to having substantially no oxygen content. In some aspects, the $O_2$ content of the second gas flow can correspond to the $O_2$ content that remains after performing a combustion reaction, such as the $O_2$ present in a combustion flue gas. In other aspects, the $O_2$ content of the second gas flow can correspond to an $O_2$ content after performing a process on the second gas flow to reduce or minimize $O_2$ content. For example, the $O_2$ content of a gas flow can be reduced by adding fuel and then using a duct burner or another supplemental combustion process to consume at least a portion of the $O_2$ in the gas flow.

In some optional aspects, such as aspects where the initial sorption step is performed under dry conditions, the equilibrium sorption capacity of the sorbent can also increase during the second sorption step. In such aspects, even if the sorbent has reached equilibrium in the first adsorption step, it may still be possible to increase the absolute loading in the second step, owing to the higher $CO_2$ concentration of the second feed. It is noted that the magnitude of this increase in equilibrium sorption capacity is reduced or minimized by the presence of increasing humidity during the initial sorption step. In such optional aspects where the humidity of the air used during the initial sorption step is sufficiently low, the two-step process benefits from both the higher equilibrium capacity and faster mass transfer during the second sorption step.

In some aspects, the sorbent can be exposed to the second gas flow at ambient temperature. Optionally, the second gas flow can be at a temperature of 40° C. to 100° C., or 40° C. to 80° C., or 50° C. to 100° C., or 50° C. to 80° C., so that the second gas can at least partially heat the sorbent during the exposure to the sorbent. Using a second gas flow with a temperature of 40° C. to 100° C. can add heat to the sorbent, which can potentially increase the sorption rate. It is noted that the higher concentration of $CO_2$ in the second gas flow can also result in an increased sorption rate. In still other aspects, it may be desirable to limit the temperature that is achieved during the exposure to the second gas flow. In such aspects, the second gas flow can be cooled to a temperature of 20° C. to 70° C., or 30° C. to 60° C. Such cooling can be achieved by any convenient method, such as by heat exchange. In some aspects, the sorbent can be exposed to the second gas flow at ambient pressure. Optionally, the pressure of the second gas flow can be any convenient pressure.

The sorbent can be exposed to the second gas flow at a flow rate of 0.002 grams-gas per second per gram-aminopolymer to 0.2 grams-gas per second per gram-aminopolymer. The gas flow rate can depend on the amount of $CO_2$ in the second gas flow and/or the nature of the absorbent. Preferably, flow rate for the second gas flow can be selected so that less than 10 vol % of the $CO_2$ entering the sorbent environment is exhausted from the sorbent environment during the second gas flow, or 7.0 vol % or less, or 5.0 vol % or less. Optionally, the flow rate and/or temperature for the second gas flow can be selected so that breakthrough of $CO_2$ does not occur until the sorbent has reached 50% or more of the maximum sorbent capacity at the temperature of the second gas flow. Breakthrough is defined herein as having an instantaneous volume flow rate of $CO_2$ exiting from the sorbent environment that is 10 vol % or more of the instantaneous volume flow rate of $CO_2$ entering the sorbent environment, or 1.0 vol % or more. The second gas flow can be exposed to the sorbent for a period of time ranging from 0.1 minutes to 5.0 minutes, or 0.1 minutes to 3.0 minutes, or 0.5 minutes to 5.0 minutes, or 0.5 minutes to 3.0 minutes.

In aspects where the second gas flow is derived from a flue gas from a combustion source (such as substantially corresponding to a flue gas from a combustion source), the second gas flow can optionally be exposed to one or more contaminant removal steps prior to exposing the second gas flow to the sorbent. In such aspects, the second gas flow can be exposed to a contaminant removal stage in order to reduce the content of sulfur oxides (SOx) and/or nitrogen oxides (NOx). This can be accomplished, for example, by passing the second gas flow through one or more guard beds that are selective for removal of sulfur oxides and/or nitrogen oxides. Other options can include, but are not limited to, performing selective catalytic reduction and/or other conventional mitigation techniques for removal of SOx and/or NOx from flue gases. It is noted that one option for a guard bed can be a contactor for direct air capture that has reached end-of-life.

When breakthrough is detected, the second gas flow can be stopped. At this point, the sorbent contains the highest loading of $CO_2$ that will be present during the cycle. In some aspects, the temperature of the sorbent environment after stopping the second gas flow can be between 40° C. and 65° C.

After stopping the second gas flow, the sorbent environment can optionally be exposed to reduced pressure (vacuum) conditions. This can be accomplished, for example, by sealing the sorbent environment and then using a pump to reduce the pressure within the sorbent environment. This can reduce or minimize the potential for sorbent degradation due to the presence of unfavorable combinations of temperature and $O_2$ concentration in the sorbent environment. In such aspects, the pressure in the sorbent environment can be reduced to a pressure of 1.0 kPa-a to 90 kPa-a, or 1.0 kPa-a to 50 kPa-a, or 1.0 kPa-a to 25 kPa-a, or 1.0 kPa-a to 10 kPa-a, or 10 kPa-a to 90 kPa-a, or 10 kPa-a to 50 kPa-a, or 10 kPa-a to 25 kPa-a. In some aspects, only a limited amount of pressure reduction may be needed to reduce or minimize the potential for sorbent degradation. In such aspects, the pressure in the sorbent environment can be reduced to 20 kPa-a to 90 kPa-a, or 40 kPa-a to 90 kPa-a, or 60 kPa-a to 90 kPa-a, or 75 kPa-a to 90 kPa-a, or 20 kPa-a to 75 kPa-a, or 40 kPa-a to 75 kPa-a.

The sorbent environment can then be heated to a temperature of 85° C. or higher in the presence of a purge gas. For example, the sorbent environment can be heated to 85° C. or higher, or 100° C. or higher, or 120° C. or higher, such as up to 200° C. or possibly still higher. Steam can be used, but gases such as $N_2$ can also be used (as well as mixtures of gases). In some aspects, the heated purge gas can be introduced immediately after the second gas flow. In other aspects, the pressure in the sorbent environment can be reduced prior to introducing the heated purge flow. As the heated purge flow passes through the sorbent environment, $CO_2$ can be desorbed from the sorbent. Optionally, this can be due to displacement by water molecules from the steam. Optionally, the pressure in the sorbent environment can be reduced to further facilitate desorption of $CO_2$.

After desorption of $CO_2$, the steam and/or other purge gas combined with the $CO_2$ can be separated from the $CO_2$. For example, if steam is used as the purge gas, the combined purge gas and $CO_2$ can be cooled to condense the water, allowing for recovery of the $CO_2$ as a gas phase product.

After desorption, the sorbent can be cooled to a temperature that is sufficiently low to mitigate oxidative degradation. If the pressure is reduced during the desorption, this can assist with reducing the temperature of the sorbent. After recovering $CO_2$, an additional purge gas (such as $N_2$) can be used to further cool the sorbent. The sorbent can then be exposed to air at ambient temperature to begin the next sorption cycle.

Characteristics of $CO_2$ Adsorption on Aminopolymers

Aminopolymers have a variety of $CO_2$ sorption characteristics that can be beneficial for performing a two-step sorption process that combines an initial direct air capture step with $CO_2$ sorption from a flue gas. One characteristic is that aminopolymers can be readily supported on other materials. For example, aminopolymers such as polypropyleneimine and/or polyethyleneimine can be supported on oxide particles or substrates, such as particles or substrates of silica, alumina, titania, or combinations thereof. As another example, aminopolymers can be deposited, grafted, or otherwise supported on monoliths or other types of structures. By supporting an aminopolymer on a particle, substrate, monolith, or other structure, the available surface area of aminopolymer within a volume can be increased while also providing a structural support for the aminopolymer. Still another characteristic is that increasing the temperature of an aminopolymer in the temperature range between 0° C. and 100° C. can facilitate more rapid sorption of $CO_2$ on a sorbent.

Configuration Example—Integration with Power Plants

In some aspects, a $CO_2$ sorption process as described herein can be used in combination with a power plant that provides a $CO_2$-containing flue gas, such as a natural gas power plant for generation of electrical power. Various options are available for integrating a power plant with a $CO_2$ sorption process.

One integration option is to simply use the flue gas from the power plant as at least a portion of the gas flow for the second step of the two-step sorption process. In this type of configuration, the steam and power for operating the two-step sorption process can be provided from a different power source.

Figure 12:
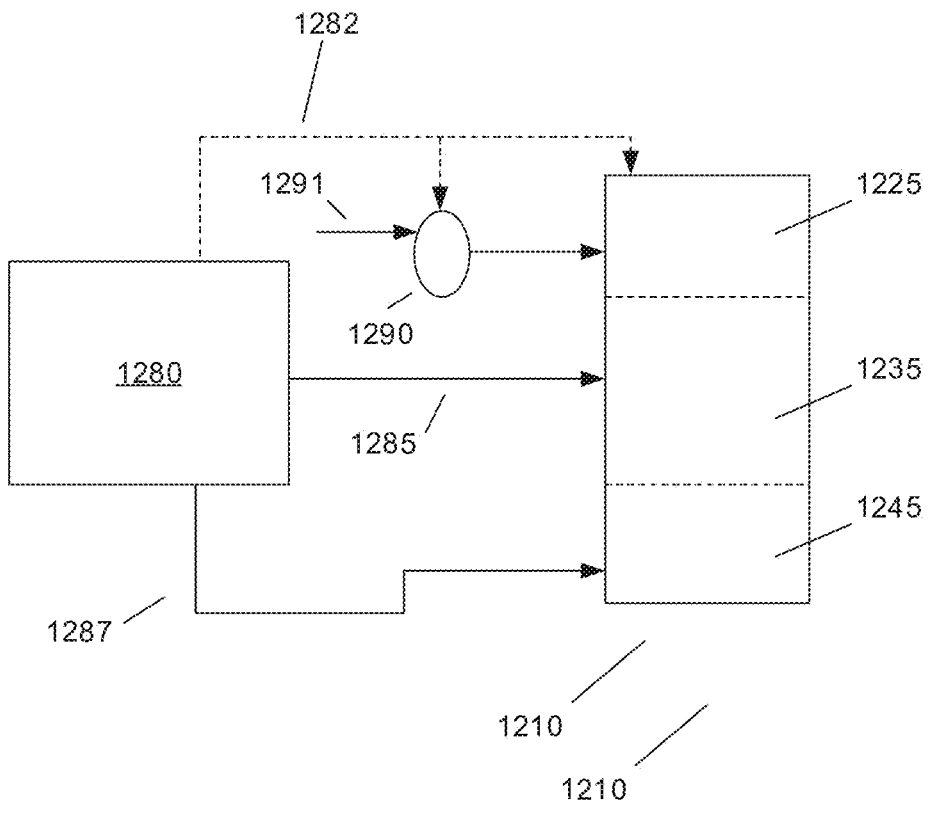
FIG. 12 shows an example of integration of a two-step sorption process with a power plant for generating power based on fuel combustion.

Another integration option is to use the power plant to not only provide a flue gas for use in the second sorption step, but also to use power and steam from the power plant to provide the power and steam used for the two-step sorption process. FIG. 12 illustrates an example of this type of integration. In FIG. 12, power plant 1280 is powered at least in part based on combustion of a hydrocarbon/hydrocarbonaceous fuel, such as natural gas. Alternatively, fuel oil, propane, diesel fuel, coal, or another convenient type of fuel could be used. During operation, power plant 1280 can generate electrical power based on combustion of the fuel. This results in production of a flue gas 1285 that contains $CO_2$. Typically such a flue gas will have a reduced or minimized content of $O_2$, such as 6.0 vol % or less, or 4.0 vol % or less, or 2.0 vol % or less, such as down to 0.5 vol % or possibly still lower. As part of producing electric power, such a power plant 1280 will typically also raise steam.

In FIG. 12, the operation of a $CO_2$ capture system 1210 is integrated with operation of power plant 1280. It is understood that $CO_2$ capture system 1210 can represent a plurality of $CO_2$ capture systems that can be associated with one or more power plants 1280. Having a plurality of capture systems can provide a variety of benefits. For example, if appropriate manifolds, valves, piping, and other components are used, the flue gas from a power plant 1280 can be passed into $CO_2$ capture systems 1210 that are in the flue gas $CO_2$ capture portion of the cycle (second sorption step 1225). This can allow for continuous processing of flue gas while other $CO_2$ capture systems are in other portions of the process cycle, such as direct air capture or regeneration.

For $CO_2$ capture system 1210, the dotted lines shown in system 1210 are used to represent the different stages of the process cycle, which include first sorption step 1225 (e.g., direct air capture), second sorption step 1235 (capture from one or more point sources), and regeneration 1245. It is understood that other additional process steps can be present in the capture cycle, such as a vacuum purge step, a vacuum cooling step, and/or any other convenient or conventional process step that might be present in a direct air capture process cycle or a $CO_2$ sorption/desorption cycle.

In the configuration shown in FIG. 12, a portion 1282 of the power generated by power plant 1280 can be used to provide power for $CO_2$ capture system 1210. This can optionally include providing power for various auxiliary components as well. For example, in the configuration shown in FIG. 12, the portion 1282 of electric power is shown as also being used to power a blower 1290 to provide air flow for the direct air capture portion 1225 of the process cycle. During the second sorption step 1235 of the process cycle, flue gas 1285 can be used as the input gas flow (or at least a portion thereof). In the example shown in FIG. 12, steam 1287 from the power plant can be used as at least a portion of the purge gas during regeneration step 1245 of the process cycle. It is noted that in other configurations, power integration can be used without having steam integration, and similarly steam integration could be used without having power integration.

In the example configuration and process illustrated in FIG. 12, the first sorption step 1225 and second sorption step 1235 are illustrated as having roughly equal sizes. In various aspects, any convenient length of time can be used for each of first sorption step 1225 and second sorption step 1235 in order to achieve a $CO_2$ capture process with a desired level of equivalent $CO_2$ capture and/or sorbent productivity.

As an example of varying the relative lengths of the first sorption step and the second sorption step, a power plant based on natural gas combustion could be used in combination with solar and/or wind power installations, with the natural gas power plant being used as a swing producer. During periods of lower demand and/or high renewable power production, the amount of power generated by the natural gas power plant can be reduced. During periods of elevated demand and/or low production from the other power installations, the amount of power generated by the natural gas power plant can be increased.

In this type of example, the amount of flue gas generated by the natural gas power plant can vary greatly. In a conventional $CO_2$ capture system that is used for only point source capture, during periods of reduced load for the natural gas power plant, only a limited amount of flue gas would be generated. As a result, the productivity of the associated $CO_2$ capture system would be low during such periods, due to lack of flue gas to process. During such periods, a two-step $CO_2$ capture system as described herein could be operated with a process cycle where the length of an initial direct air capture step is extended, while the portion of the process cycle for flue gas capture is reduced. This can allow any excess sorbent capacity in the $CO_2$ capture system(s) to be used for additional direct air capture, as opposed to simply having idle capacity. When the demand for power from the natural gas power plant increases, the process cycle can be adapted to reduce the time for direct air capture, thus allowing for substantially complete capture of $CO_2$ from the flue gas while still achieving some of the benefits of having an initial direct air capture sorption step.

Example 1—Model Comparison of Direct Air Capture with Combined Direct Air Capture and Point Source Capture A semi-empirical model was constructed based on $CO_2$ sorption isotherms for a polyethyleneimine sorbent, $CO_2$ transport measurements, and mass/momentum/energy balance equations. The semi-empirical model was used for modeling a sorption/desorption cycle based on exposure of direct air capture sorbent-containing contacting vessels ("contactors") to $CO_2$-containing flows. This process model was then used to model $CO_2$ capture in an industrial scale process. In this process, a sorbent environment containing model direct air capture contactors was used to provide a direct air capture environment suitable for sorption of $CO_2$ at a rate of 100 kilotons per year. The sorption step(s) were modeled as described below. After sorption, desorption of $CO_2$ during each cycle was modeled using 100° C. steam.

FIG. 1 shows a comparison of model operation when the sorbent environment is used for only direct air capture (model 110) versus using the sorbent environment for sequentially performing direct air capture followed by point source capture (model 120). For the direct air capture in model 110, during each cycle the sorbent environment was exposed to a cycle-averaged air rate of 9000 $Nm^3/s$ of air, with 900 seconds per cycle allocated to air capture and 58 seconds per cycle to other steps (e.g. regeneration). This resulted in capture of 100 kilotons per year of $CO_2$ while allowing 120 kilotons per year of $CO_2$ to pass through the sorbent environment. It is noted that any $CO_2$ that passes through the sorbent environment corresponds simply to $CO_2$ that is returned to the air, which was the starting point for the $CO_2$. Thus, if higher flow rates are used to increase the rate of sorption, there is little or no downside to having a substantial portion of $CO_2$ that simply passes through the sorbent environment without being sorbed.

The modeled air included 400 vppm of $CO_2$. The temperature of the air was 30° C. After completing the sorption step, steam-assisted desorption of the sorbed $CO_2$ was approximately modeled using nitrogen at 100° C., with the flow rate selected to match the expected heating/desorption rate using condensing steam. The desorption step continued until the adsorbent reached a specified mean absolute loading of $CO_2$, the value of which was selected to achieve a compromise between enough $CO_2$ removal for high cyclic $CO_2$ capacity but not so much removal that $CO_2$ desorption requires excessive steam or N2. After desorption, ambient air was again introduced to restart the cycle. For the purposes of the model, a separate cooling step was not performed prior to introducing ambient air again. In a real-world system, a separate cooling step could be used to return the sorbent to a temperature that is sufficiently low to mitigate oxidative degradation prior to introducing ambient air, in order to avoid the potential for damage to the amine-based sorbent in the brief period of time before the ambient air cools the sorbent environment. In the model, the entire cycle was simulated five times in sequence to adequately approach a cyclic steady state.

For the sequential sorption process (model 120), the initial sorption step was to expose the sorbent environment to a cycle-averaged flow rate of 8000 $Nm^3$/s of air, with 800 seconds per cycle for air capture and 162 seconds per cycle for other steps. This resulted in sorption of 93 kilotons of $CO_2$ per year while allowing 102 kilotons per year of $CO_2$ to pass through the sorbent environment. Due in part to the short initial sorption step, slightly less $CO_2$ is sorbed during the direct air capture portion of the sequential process. After the initial sorption, the sorbent environment is then exposed to a second gas flow that contains 7.5 vol % of $CO_2$ and 3.0 vol % $O_2$ (balance $N_2$). The second gas flow had a cycle-averaged flow rate of 20 $Nm^3$/s and a temperature of 100° C., with 100 seconds per cycle reserved for the second gas flow and the remaining 62 seconds reserved for other process steps (e.g. regeneration). This second gas flow was selected to be representative of a flue gas from a combustion source that had been cooled to 100° C. to allow for introduction into the sorbent environment. The second gas flow was exposed to the sorbent environment for 100 seconds, which roughly corresponded to the point where breakthrough occurred. Due to the higher $CO_2$ concentration, a substantially smaller gas flow can be used for a shorter period of time while still sorbing a comparable amount of $CO_2$. As shown in FIG. 1, the total gas flow during the second step contained 92 kilotons per year of $CO_2$. Of this $CO_2$, 88 kilotons was sorbed by the sorbent, while 4 kilotons per year was exhausted from the sorbent environment. The 4 kilotons per year of exhausted $CO_2$ was selected to represent a process where "breakthrough" $CO_2$ is detected as the condition for ending the second sorption step. During the second sorption step, the model predicted that the process sorbs nearly 100% of the $CO_2$ in the second gas flow, so no additional $CO_2$ was exhausted other than the 4 kilotons per year that represents the "breakthrough" $CO_2$.

Based on the model processes showed in FIG. 1, using a sequential sorption process allowed for a substantial productivity increase for the sorbent environment while also capturing the equivalent of more than 100 vol % of the $CO_2$ generated by a point source. In the direct air capture only process of model 110, 100 kilotons per year of $CO_2$ was sorbed. In model 120, the initial direct air capture step sorbed only 93 kilotons per year. However, the second sorption step resulted in sorption of an additional 88 kilotons per year. Thus, in the same total time period for the combined sorption steps (900 seconds), the second sorption process resulted in sorption of 181 kilotons per year of $CO_2$. Even after subtracting the 4 kilotons per year of $CO_2$ that was exhausted during the second sorption step (representing $CO_2$ from the point source that was lost to the external environment), the sequential sorption process in model 120 resulted in net sorption of more than 177 kilotons per year during the same process cycle that resulted in sorption of only 100 kilotons per year via direct air capture. This corresponds to an 81% increase in gross productivity or a 77% increase in net productivity of the sorbent environment for the sequential sorption process.

The sequential sorption process also provides improvements relative to point source capture alone. By definition, when performing $CO_2$ sorption on only a point source, the maximum $CO_2$ that can be sorbed is 100 vol % of the $CO_2$ from the point source. By contrast, by using a sequential process that combines direct air capture and point source capture, the sorbent environment in model 120 was able to sorb the equivalent of nearly 200 vol % of the $CO_2$ from the point source. It is noted that due to the relatively short time of sorption for the second gas flow, a large plurality of parallel sorbent environments would be used to allow for continuous capture from the point source while also allowing each sorbent environment to perform a sequential sorption process.

In addition to providing improved productivity and/or improved net sorption, the sequential process can also provide energy savings. As noted above, the desorption of $CO_2$ was performed using $N_2$ at 100° C. and a flow rate that reproduces the expected heating/desorption rates under steam regeneration. For model 110, this required raising the temperature of the sorbent environment from 30° C. to 88° C. needed to achieve a specified CO2 loading. By contrast, for model 120, substantial heating of the sorbent environment occurred during the second sorption step. Due to this substantial heating, the temperature at the end of the second sorption step was roughly 75° C. As a result, substantially less steam was needed to heat the sorbent environment to 88° C. to achieve the same loading as in model 110. This difference in energy required to reach 88° C. can be seen in FIG. 2, which shows the energy credit in GJ per ton of $CO_2$ captured for the second process. It is noted that FIG. 2 does not necessarily reflect the amount of steam that would be needed if only steam was used as the purge gas during a sorption step. Rather, FIG. 2 indicates the potential energy savings that can be realized if the only steam that is used is the steam needed for achieving a target desorption temperature. It is noted that the relative size of the energy credit is dependent on the thermal mass of the contactor and/or the contactor support structure.

Figure 3:
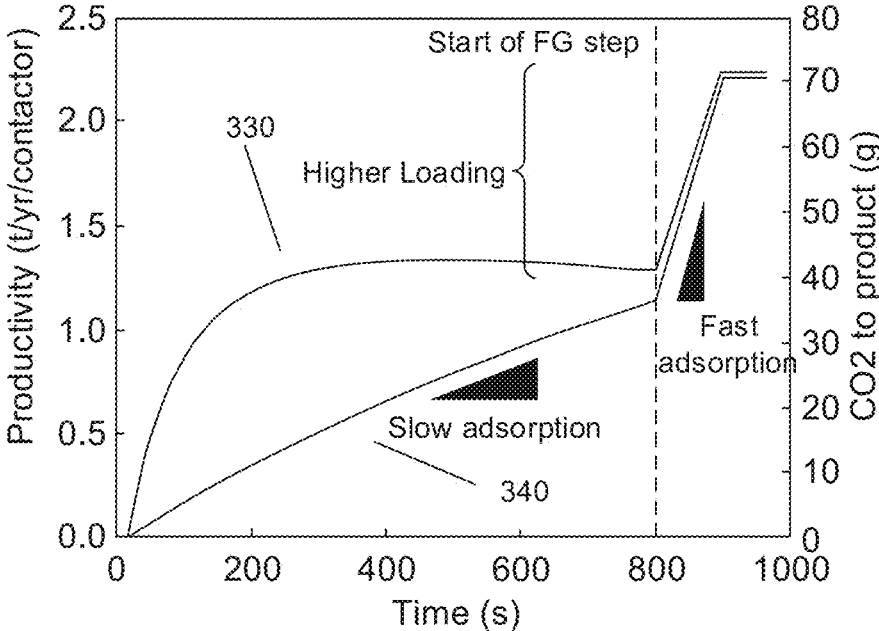
FIG. 3 shows $CO_2$ sorption and sorbent productivity for a two-step sorption process.

To further illustrate the benefits of the two-step capture process, FIG. 3 shows the cumulative productivity as a function of adsorption duration, accounting for time needed to regenerate the sorbent back to its beginning loading prior to the start of the sorption step (left axis), and $CO_2$ captured for sequestration (right axis) for an individual contactor in the modeled two step capture process. In FIG. 3, the bottom axis corresponds to the time of the sorption portion of the cycle. It is noted that the direct air capture portion of the sorption cycle stops at 800 seconds, at which point the high $CO_2$ content gas flow for the second sorption step is started. As shown in FIG. 3, most of the sorption time during the first 800 seconds (the direct air capture portion) corresponds to slow sorption of $CO_2$. Even though the sorption of $CO_2$ (right axis, curve 340) during the first 800 seconds occurs relatively evenly, the productivity (left axis, curve 330) of the contactor sharply increases at the beginning and only plateaus after roughly 200 seconds, when the adsorption time becomes long compare to the regeneration time. This represents a trade-off often encountered with direct air capture, where the time on adsorption is balanced with the time for desorption in order to maximize productivity. However, by adding a second sorption step using a higher temperature, high $CO_2$ concentration gas, both the productivity and the $CO_2$ sorption are rapidly increased during the final 100 seconds of the second sorption process. It is noted that both the productivity (curve 330) and the $CO_2$ capture (curve 340) become horizontal at 900 seconds, which is the end of the sorption steps and the start of the regeneration step. The total cycle length for the modeled process was 963 seconds.

Figure 4:
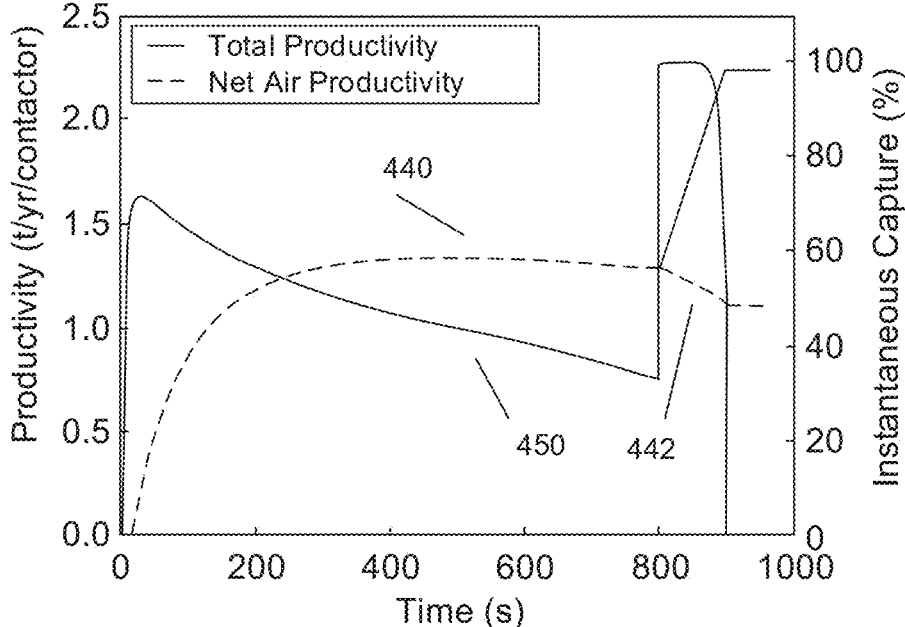
FIG. 4 shows instantaneous $CO_2$ capture and cumulative productivity for a two-step sorption process.

Productivity can also be compared with the amount of instantaneous capture of $CO_2$ that is occurring during the sorption/desorption cycle. FIG. 4 shows the instantaneous $CO_2$ capture percentage 450 (right axis) during the cycle. FIG. 4 also shows the cumulative productivity (440, left axis) and the net direct air capture productivity (442, left axis) during the cycle. As shown in FIG. 4, the instantaneous capture of $CO_2$ during the direct air capture step is less than 50% for most of the direct air capture process. After 800 seconds, however, when the second gas flow is exposed to the sorbent, the capture percentage increases to 100%. Once breakthrough starts near the end of the exposure of the second gas flow to the sorbent, the capture percentage drops quickly to 0%. With regard to cumulative productivity, it is noted the period where the second gas flow is still occurring but the capture percentage drops to zero results in an additional decrease in the direct air capture productivity 442. The other reason that the direct air capture productivity decreases is that no new $CO_2$ from air is captured, despite the continuously increasing adsorption time.

Example 2—Management of Temperature and Oxygen Content

The models described in Example 1 were also used to investigate the temperature profile and $O_2$ concentration profile within a direct air capture contactor during a sorption/desorption cycle. Based on the modeling, it was discovered that performing a second sorption step using a second gas stream with a relatively low $O_2$ content could potentially allow a sorption/desorption cycle to be performed without using a vacuum purge while also purging the sorbent of $O_2$ at a much faster timescale than the time scale at which heating occurs.

Figure 5:
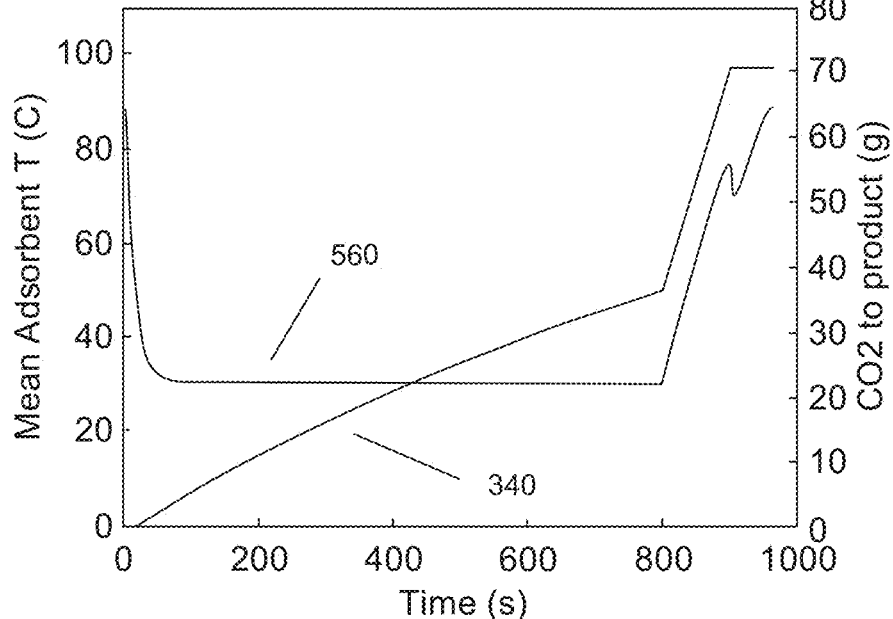
FIG. 5 shows sorbent temperature during a two-step sorption process.
Figure 6:
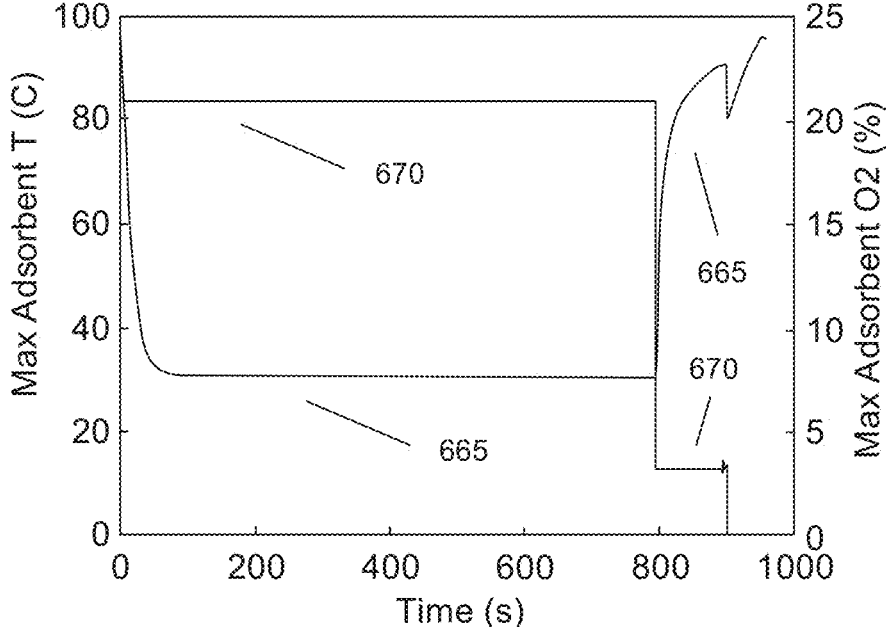
FIG. 6 shows maximum temperature and maximum $O_2$ concentration in a sorbent environment during a two-step sorption process.
Figure 7:
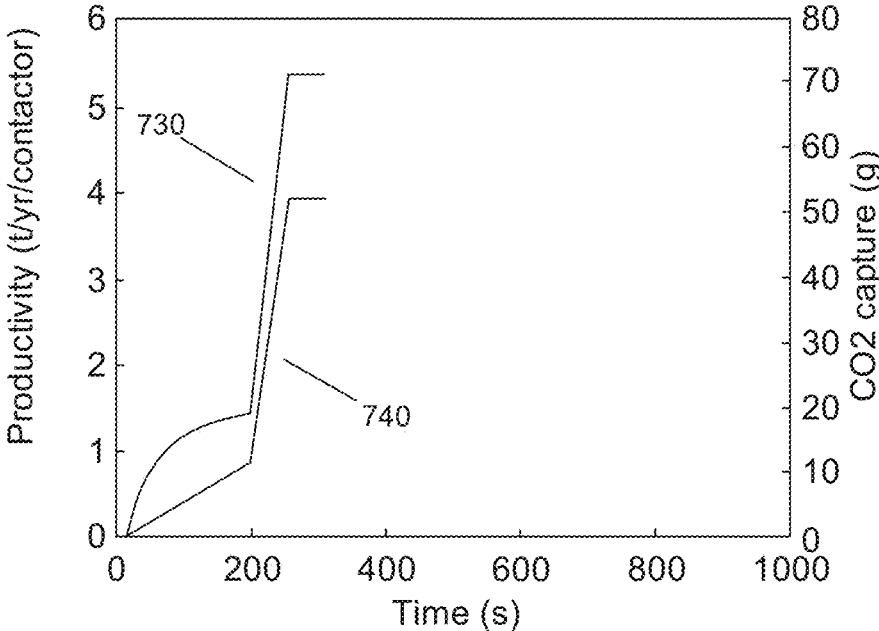
FIG. 7 shows $CO_2$ sorption and sorbent productivity for a two-step sorption process.

In the data shown in FIG. 5, FIG. 6, and FIG. 7, modeling runs are shown based on using a second gas flow with an $O_2$ content of 3.0 vol %. The data below illustrate the relative time scales for the sorbent environment to undergo a change in temperature versus a change in the $O_2$ concentration in the environment. It is understood that a second gas flow with any convenient amount of $O_2$ could be used in a similar manner. Thus, if it was desirable to limit the $O_2$ concentration to 3.0 vol % or less, or 1.0 vol % or less, or 0.1 vol % or less (such as down to substantially no $O_2$ content), a second gas flow with a corresponding amount of $O_2$ content can be used.

FIG. 5 shows the average temperature of an individual contactor during the sorption portion of the two-step capture process. In FIG. 5, curve 560 (left axis) shows the average temperature of the aminopolymer during the sorption process. Curve 340 ($CO_2$ captured for sequestration, right axis) is shown again to facilitate comparison with the temperature curve 560. As shown in FIG. 5, for the first 800 seconds, the temperature is relatively stable at 30° C., as would be expected during the direct air capture process portion of the cycle. Once the direct air capture process is completed, the temperature starts to rise based on heat transfer from the second gas stream and heat generated by rapid $CO_2$ sorption from a stream with low thermal mass (mass flow rate*Cp)

per mol of $CO_2$. Due to the lower flow rate and limited time of the second sorption step, however, exposing the sorbent to a second gas flow at a temperature of 100° C. only resulted in the average contactor temperature increasing to roughly 75° C.-80° C. by the end of the second sorption step. At 900 seconds, there is a small drop in the temperature of the contactor as the gas flow is switched from the second gas flow to the steam or $N_2$ purge gas flow, initiating rapid, endothermic $CO_2$ desorption from a high $CO_2$ loading.

FIG. 5 illustrates that the mean (average) temperature increases at a much slower timescale than the timescale at which $O_2$ is purged down to the concentration in the second gas flow. However, damage to an amine-based sorbent could still occur if local temperatures reached 70° C. or higher in the presence of sufficient $O_2$. FIG. 6 shows the maximum temperature within a contactor (curve 665, left axis) along with the maximum $O_2$ concentration present in the sorbent environment (curve 670, right axis).

As shown in FIG. 6, at 800 seconds when the second gas flow starts, the $O_2$ concentration rapidly drops to match the 3.0 vol % $O_2$ concentration of the second gas flow in ~2 seconds, while the maximum temperature in the sorbent environment takes much longer to reach a value of 80 C: ~27 seconds. The ratio of these timescales is 13.5. More generally, one option for characterizing a second sorption step can be based on a ratio of a) when the sorbent environment reaches a maximum temperature of 70° C. or higher, or 80° C. or higher, or 90° C. or higher, such as up to 100° C. or possibly still higher, versus b) when the sorbent environment reaches an $O_2$ concentration that is substantially the same as the $O_2$ concentration in the second gas flow. In various aspects, this ratio can have a value of 3.0 or more, or 5.0 or more, or 8.0 or more, or 10 or more, or 15 or more, such as up to 30 or possibly still higher. Having a suitable high ratio of time for reaching a maximum temperature of 70° C. or higher (or 80° C. or higher, or 90° C. or higher) versus the time to substantially have the same $O_2$ concentration as the second gas flow can be an indicator of a second sorption step that can protect the amine-based sorbent from oxidative degradation.

The time scale for having the mean or average temperature in the sorbent environment reach a given threshold temperature can also be characterized. The mean temperature of the sorbent increases even more slowly than the maximum temperature. Based on the data shown in FIG. 5, the sorbent environment takes 100 seconds to reach 76° C. The ratio of this timescale to the timescale of $O_2$ purging (i.e., reducing to the $O_2$ content of the second gas flow) is roughly 50.

The large separation of timescales between the increase in mean temperature of the sorbent environment and the decrease in $O_2$ concentration can be approximately understood by considering the residence time of the second gas flow, the thermal mass of the sorbent, and the heat release due to $CO_2$ sorption. It is noted that heat convected in/out of the sorbent is not considered in this analysis, because the second gas flow has a low thermal mass flow rate. For example, if flow through the sorbent is laminar through approximately cylindrical channels, then the time needed to purge 95% of the difference in $O_2$ between the air and second gas flow can be approximated using the cumulative residence time distribution for laminar flow through a pipe: $\tau_{purge}=2.24\tau_{res}$. For the sorbent in FIG. 6 during the second sorption step, this approximate timescale would be 1.9 seconds. The timescale for heating the sorbent from an average (mean) temperature of 30° C. to 76° C. can be approximated using an energy balance on the sorbent, neglecting convective heat transfer with the gas:

$$\tau_{heat} = \frac{\rho C_p \Delta T}{r \Delta H_{rxn}},$$

where $\rho$ is the density of the sorbent (g/g aminopolymer), $C_p$ is the heat capacity (J/g sorbent), r is the adsorption rate (g $CO_2$/s/g aminopolymer), and $\Delta H_{rxn}$ is the heat of adsorption of $CO_2$ onto the amine (J/g $CO_2$). For the sorbent in FIG. 6 during the second sorption step, $T_{heat}$ estimated with this equation is 135 seconds, so the ratio $\tau_{heat}/\tau_{purge}$ is estimated to be 71, which is close to the value of 50 from the detailed model. Hence, it is shown that this separation of timescales can be adjusted by increasing the thermal mass of the sorbent ($\rho C_p$) or decreasing the residence time ($T_{res}$) of the second gas flow through the sorbent.

Example 3—Two-Step Sorption with Faster Cycle Time

Figure 13:
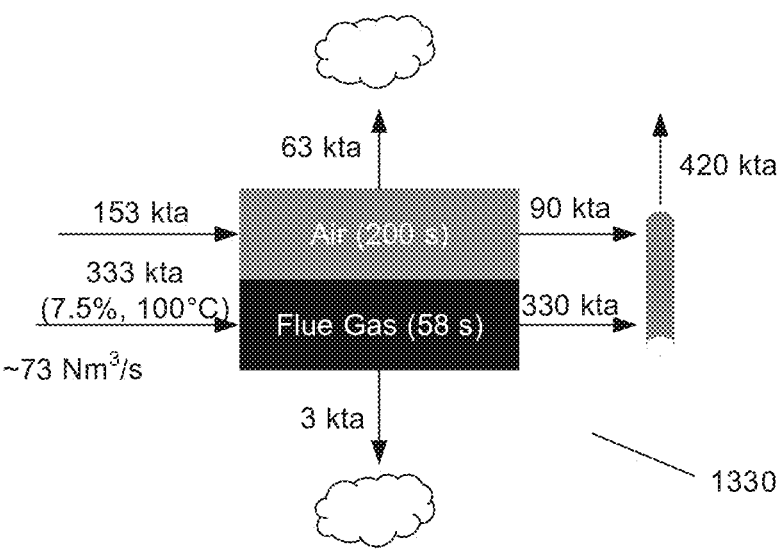
FIG. 13 illustrates general results from modeling of another two step sorption process.

The model was used to simulate another process, but with a shorter direct air capture step. Although this reduces the amount of $CO_2$ captured prior to contacting the sorbent with a flue gas, the overall productivity for the sorbent can be increased. FIG. 13 provides an illustration of this process, similar to the process illustrations shown in FIG. 1. FIGS. 7 to 11 provide information similar to FIGS. 3 to 6, but for this higher productivity two-step process shown in FIG. 13.

In FIG. 13, model 1330 corresponds to a sequential sorption process with an initial air capture step of 200 seconds and a secondary capture step of 58 seconds. The cycle-averaged flue gas rate for the process model in FIG. 13 is also roughly 3.5 times the flue gas flow rate in FIG. 1 (73 $Nm^3$/s vs 20 $Nm^3$/s). For the process model in FIG. 13, the ratio of the time for the direct air capture step versus the time for secondary gas capture step is between 3:1 and 4:1. This is in contrast to the longer sequential sorption process shown in FIG. 1, which has a ratio of time for the direct air capture step to time for secondary gas capture step of roughly 8:1. This results in a substantially shorter process cycle for the process shown in FIG. 13, resulting in different productivity curves.

FIG. 7 shows the cumulative productivity as a function of adsorption duration (for the process shown in FIG. 13), accounting for time needed to regenerate the sorbent back to its initial loading (left axis), and $CO_2$ captured for sequestration (right axis) for an individual contactor in the modeled two step capture process. In FIG. 7, the bottom axis corresponds to the time of the sorption portion of the cycle. In FIG. 7, the direct air capture portion of the sorption cycle stops at 200 seconds, at which point the high $CO_2$ content gas flow for the second sorption step is started. As shown in FIG. 7, by shortening the direct air capture portion of the cycle to only 200 seconds, a smaller portion of the total cycle corresponds to slow sorption of $CO_2$. Thus, both sorption of $CO_2$ (right axis, curve 740) and productivity increase during the first 200 seconds corresponding to the direct air capture portion of the cycle. The second sorption step then begins, with still larger gains in sorption of $CO_2$ and productivity over a relatively short time. As shown in FIG. 7, limiting the initial sorption step reduces the amount of excess sorption of $CO_2$ that can occur (relative to the $CO_2$ in the flue gas stream of the second sorption step), but the overall productivity is substantially increased.

Figure 8:
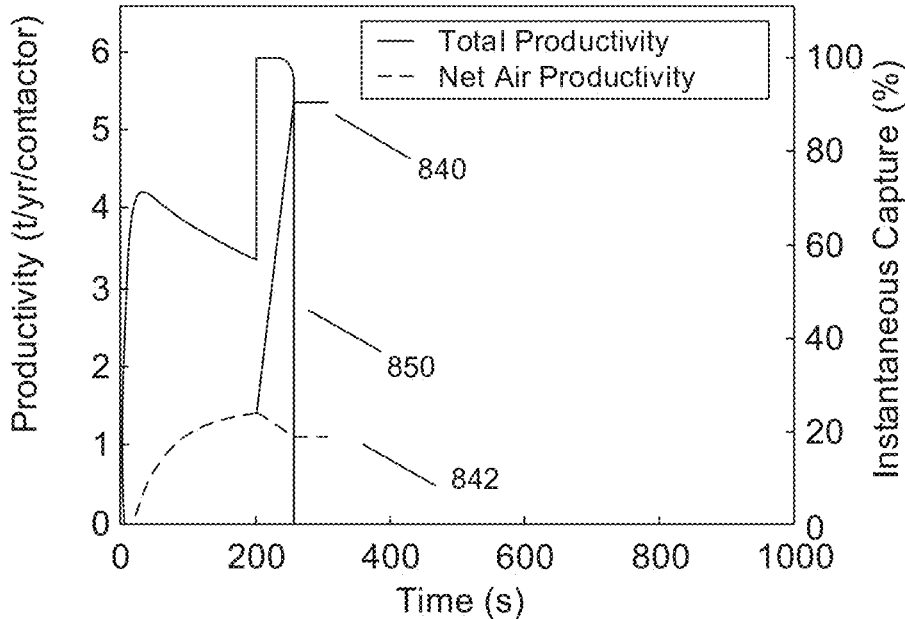
FIG. 8 shows instantaneous $CO_2$ capture and cumulative productivity for a two-step sorption process.

Productivity can also be compared with the amount of instantaneous capture of $CO_2$ that is occurring during the sorption/desorption cycle. FIG. 8 shows the instantaneous $CO_2$ capture percentage 850 (right axis) during the cycle. FIG. 8 also shows the cumulative productivity (840, left axis) and the net direct air capture productivity (842, left axis) during the cycle. As shown in FIG. 8, by shortening the direct air capture step, the instantaneous capture of $CO_2$ during the direct air capture step is greater than 50% for most of the direct air capture process.

Figure 9:
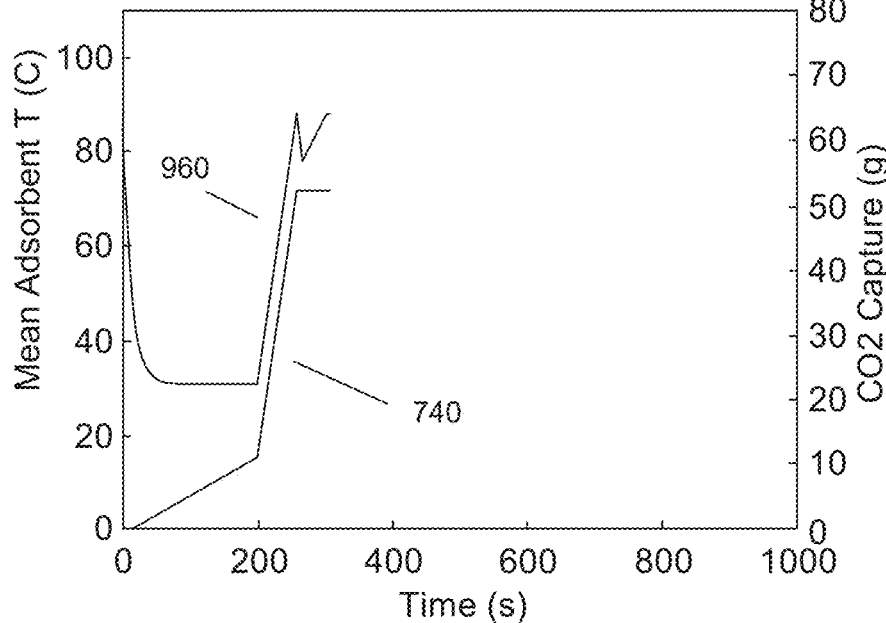
FIG. 9 shows sorbent temperature during a two-step sorption process.

FIG. 9 shows the average temperature of an individual contactor during the sorption portion of the two-step capture process. In FIG. 9, curve 960 (left axis) shows the average temperature of the aminopolymer during the sorption process. Curve 740 ($CO_2$ captured for sequestration, right axis) is shown again to facilitate comparison with the temperature curve 960. As shown in FIG. 9, even though the initial direct air capture step is shorter at only 200 seconds, the average temperature of the sorbent still stabilizes at roughly 30° C. well before the start of the second sorption step. As a result, the temperature profile and $CO_2$ capture for the second sorption step shown in FIG. 9 is similar to the second sorption step shown in FIG. 5.

Figure 10:
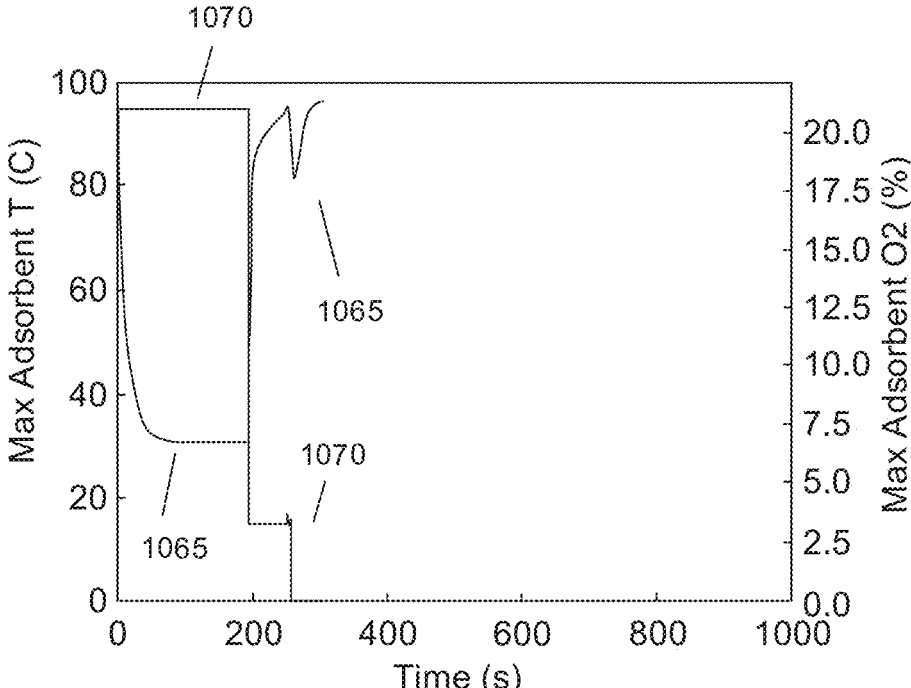
FIG. 10 shows maximum temperature and maximum $O_2$ concentration in a sorbent environment during a two-step sorption process.

FIG. 10 shows the maximum temperature within a contactor (curve 1065, left axis) along with the maximum $O_2$ concentration present in the sorbent environment (curve 1070, right axis). FIG. 10 is qualitatively similar to FIG. 6, with the main difference being the length of initial direct air capture step. In FIG. 6, the ratio of the time for the maximum temperature to reach 80° C. to the time for the maximum $O_2$ concentration to be substantially the same as the flue gas concentration is greater than 4.0.

Figure 2:
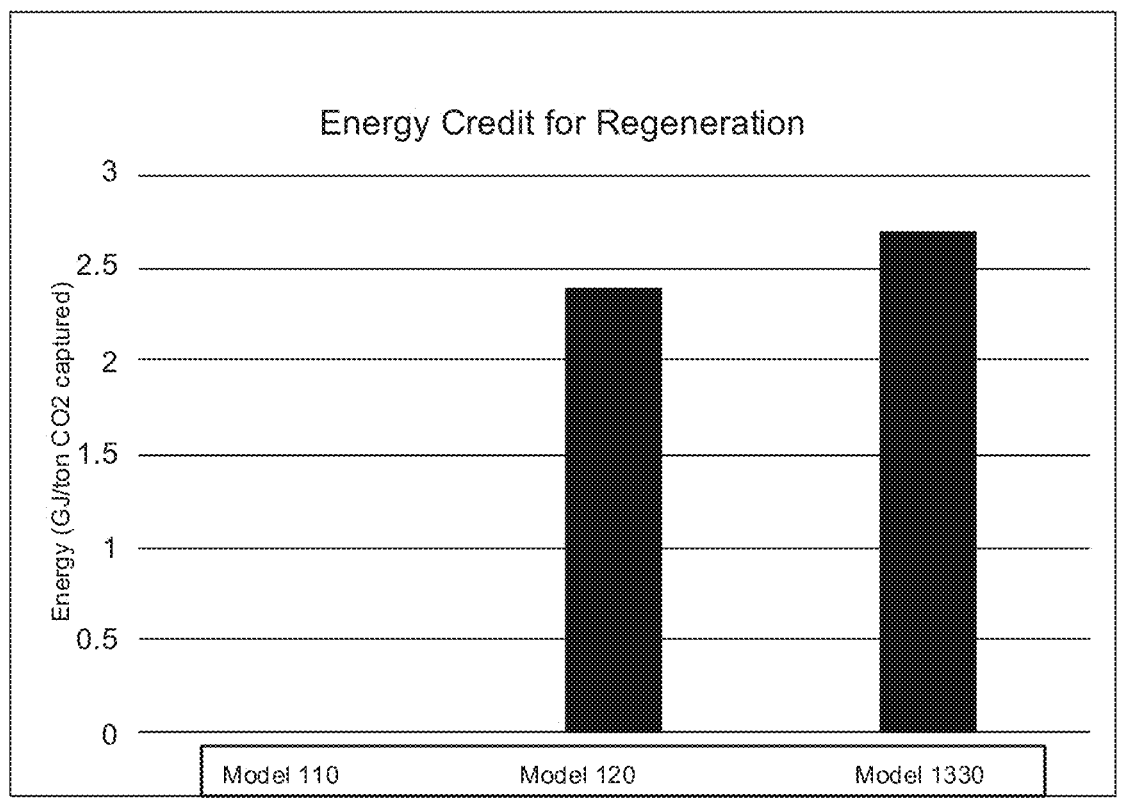
FIG. 2 shows a difference in energy requirements for sorbent regeneration between a direct air capture process and a two step sorption process.

FIG. 2 also shows the energy savings for the process corresponding to model 1330. As shown in FIG. 2, the process corresponding to model 1330 had still further energy savings relative to the base case. This additional energy savings is due in part to the greater amount of $CO_2$ uptake during the second sorption step in the process corresponding to model 1330, which resulted in greater heating of the sorbent. As a result, the sorbent in model 1330 was closer to 88° C. in temperature prior to heating the sorbent with the steam.

Example 4—Variations on Two-Step Sorption Processes

More generally, any convenient combination of a direct air capture sorption step and a second gas flow (point gas capture) step can be combined in the manner described herein. This can include variations in the length of the two capture steps, variations in the $CO_2$ concentrations, and/or variations in the temperature of the gas flows.

Figure 11:
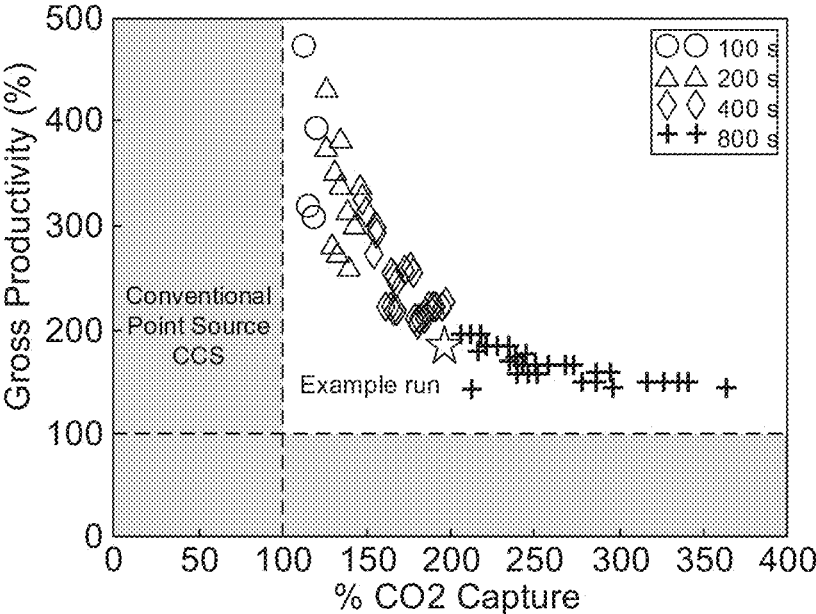
FIG. 11 shows productivity and $CO_2$ sorption amounts for various two-step sorption processes.

A variety of additional modeling runs were performed using the model described in Example 1. The additional modeling runs included variations in the direct air capture step time, so that the direct air capture step corresponded to 200 seconds, 400 seconds, 600 seconds, or 800 seconds. Variations in the flow rate for the first gas flow, flow rate for the second gas flow, temperature of the second gas flow, the criterion for when to stop the second sorption step (<90% instantaneous capture versus <99% instantaneous capture), and $CO_2$ concentration in the second gas flow were also modeled. When modeling these variations in conditions, after exposure of the sorbent to the initial gas flow for a selected length of time, the sorbent was then exposed to the second gas flow until the instantaneous $CO_2$ capture fell below the stopping criterion, defining a breakthrough condition. FIG. 11 shows the total productivity versus $CO_2$ capture percentage for the various additional modeling runs. It is noted that the model run described in Example 1 is indicated in FIG. 11 by the star symbol.

In FIG. 11, productivity was normalized so that 100% productivity corresponds to the productivity of performing a direct air capture process for 900 seconds at 30° C. The $CO_2$ capture percentages were normalized so that 100% $CO_2$ capture corresponds to capture of 100% of the available $CO_2$ during the second sorption (point source capture) step.

As shown in FIG. 11, various combinations of direct air capture step and second sorption step can be used while still achieving substantial advantages over either type of stand-alone process. All of the additional modeling runs shown in FIG. 11 involve greater than 100% $CO_2$ capture relative to just attempting to capture $CO_2$ from the point source flow. All of the additional modeling runs in FIG. 11 also have productivity greater than 100% relative to the productivity of just performing direct air capture.

Additional Embodiments

Embodiment 1. A method of method of sorbing $CO_2$, comprising: exposing a first gas flow comprising 15 vol % to 25 vol % $O_2$ and 100 vppm to 800 vppm $CO_2$ to one or more amine sorbents in a sorbent environment at a first temperature of 10° C. to 35° C. to form one or more partially loaded amine sorbents comprising a first sorbent loading of $CO_2$ sorbed during the exposing the first gas flow; exposing a second gas flow comprising 1.0 vol % to 20 vol % $CO_2$ and a second temperature higher than the first temperature to the one or more partially loaded amine sorbents in the sorbent environment to form one or more additionally loaded amine sorbents comprising a second sorbent loading of $CO_2$ sorbed during the exposing the second gas flow, a ratio of the second sorbent loading to the first sorbent loading being 0.02 or more; passing a purge gas flow through the sorbent environment; and heating the sorbent environment to a temperature of 85° C. or higher to desorb at least a portion of the $CO_2$ from the one or more additionally loaded amine sorbents.

Embodiment 2. The method of Embodiment 1, wherein a pressure of the sorbent environment at a beginning of the exposing the second gas flow is 50 kPa-a or higher.

Embodiment 3. The method of any of the above embodiments, wherein the second temperature is 15° C. to 40° C.

Embodiment 4. The method of Embodiment 1 or 2, wherein the second temperature is 40° C. to 100° C., wherein the second gas flow comprising a second $O_2$ concentration, and wherein during the exposing the second gas flow, a ratio of a time for the sorbent environment to have a maximum temperature corresponding to the second temperature versus a time for the sorbent environment to have the second $O_2$ concentration is 5.0 or more.

Embodiment 5. The method of any of the above embodiments, wherein the one or more amine sorbents comprise at least one aminopolymer.

Embodiment 6. The method of Embodiment 5, wherein the one or more amine sorbents have an absolute loading of 3.0 mmol-$CO_2$/g-aminopolymer or less prior to exposing the first gas flow to the one or more amine sorbents, or wherein the first sorbent loading is greater than the second sorbent loading.

Embodiment 7. The method of Embodiment 5 or 6, wherein the first sorbent loading is 0.5 mmol-$CO_2$/g-aminopolymer or more, or wherein the first sorbent loading is 0.5 mmol-$CO_2$/g-aminopolymer to 2.5 mmol-$CO_2$/g-aminopolymer.

Embodiment 8. The method of any of Embodiments 5 to 7, wherein the second sorbent loading is 1.0 mmol-$CO_2$/g-aminopolymer to 4.0 mmol-$CO_2$/g-aminopolymer, or wherein the second sorbent loading is 4.0 mmol-$CO_2$/g-aminopolymer to 7.0 mmol-$CO_2$/g-aminopolymer.

Embodiment 9. The method of any of the above embodiments, wherein desorbing at least a portion of the $CO_2$ from the one or more additionally loaded amine sorbents forms one or more regenerated amine sorbents, the method further comprising: cooling the sorbent environment to a temperature of less than 90° C. and above the temperature of the first gas flow; and exposing another portion of the first gas flow to the one or more regenerated amine sorbents.

Embodiment 10. The method of Embodiment 9, wherein a time for the exposing another portion of the first gas flow is greater than a time for the exposing the first gas flow, or wherein a time for the exposing another portion of the first gas flow is less than a time for the exposing the first gas flow.

Embodiment 11. The method of any of the above embodiments, wherein heating the sorbent environment comprises passing the purge gas flow through the sorbent environment, the purge gas flow comprising a temperature of 85° C. or higher.

Embodiment 12. The method of any of the above embodiments, wherein the first gas flow comprises air; or wherein the second gas flow comprises at least a portion of a combustion flue gas; or a combination thereof.

Embodiment 13. The method of any of the above embodiments, wherein 95 vol % or more of the volume of $CO_2$ in the second gas flow during the exposing the second gas flow is sorbed by the one or more partially loaded amine sorbents.

Embodiment 14. The method of any of the above embodiments, wherein a temperature of the sorbent environment after the exposing the second gas flow is 80° C. or less.

Embodiment 15. The method of any of the above embodiments, the second gas flow comprising at least a portion of a combustion flue gas from a power plant, wherein i) the purge gas flow comprises steam generated by the power plant, ii) at least a portion of the power for performing the method of sorbing $CO_2$ is provided by the power plant, or iii) a combination of i) and ii).

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The foregoing description of the disclosure illustrates and describes the present methodologies. Additionally, the disclosure shows and describes exemplary methods, but it is to be understood that various other combinations, modifications, and environments may be employed and the present methods are capable of changes or modifications within the scope of the concept as expressed herein, commensurate with the above teachings and/or the skill or knowledge of the relevant art.

We claim:

1. A method of sorbing CO2, comprising:

exposing a first gas flow comprising 15 vol % to 25 vol % $O_2$ and 100 vppm to 800 vppm $CO_2$ to one or more amine sorbents in a sorbent environment at a first temperature of 10° C. to 35° C. to form one or more partially loaded amine sorbents comprising a first sorbent loading of CO2 sorbed during the exposing the first gas flow;

exposing a second gas flow comprising 1.0 vol % to 20 vol % $CO_2$ and a second temperature higher than the first temperature to the one or more partially loaded amine sorbents in the sorbent environment to form one or more additionally loaded amine sorbents comprising a second sorbent loading of $CO_2$ sorbed during the exposing the second gas flow, a ratio of the second sorbent loading to the first sorbent loading being 0.02 or more;

passing a purge gas flow through the sorbent environment; and heating the sorbent environment to a temperature of 85° C. or higher to desorb at least a portion of the $CO_2$ from the one or more additionally loaded amine sorbents;

wherein the second gas flow comprises a second $O_2$ concentration, wherein during the exposing the second gas flow, a ratio of a time for the sorbent environment to reach a maximum temperature of 80° C. or higher versus a time for the sorbent environment to reach the second $O_2$ concentration is 4.0 or more, the maximum temperature being the highest temperature in the sorbent environment.

2. The method of claim 1, wherein a pressure of the sorbent environment at a beginning of the exposing the second gas flow is 50 kPa-a or higher.

3. The method of claim 1, wherein the second temperature is 85° C. to 100° C.

4. A method of sorbing CO2, comprising:

exposing a first gas flow comprising 15 vol % to 25 vol % $O_2$ and 100 vppm to 800 vppm $CO_2$ to one or more amine sorbents in a sorbent environment at a first temperature of 10° C. to 35° C. to form one or more partially loaded amine sorbents comprising a first sorbent loading of CO2 sorbed during the exposing the first gas flow;

exposing a second gas flow comprising 1.0 vol % to 20 vol % $CO_2$ and a second temperature higher than the first temperature to the one or more partially loaded amine sorbents in the sorbent environment to form one or more additionally loaded amine sorbents comprising a second sorbent loading of $CO_2$ sorbed during the exposing the second gas flow, a ratio of the second sorbent loading to the first sorbent loading being 0.02 or more;

passing a purge gas flow through the sorbent environment; and heating the sorbent environment to a temperature of 85° C. or higher to desorb at least a portion of the $CO_2$ from the one or more additionally loaded amine sorbents;

wherein desorbing at least a portion of the $CO_2$ from the one or more additionally loaded amine sorbents forms one or more regenerated amine sorbents, the method further comprising:

cooling the sorbent environment to a temperature of less than 90° C. and above the temperature of the first gas flow; and exposing another portion of the first gas flow to the one or more regenerated amine sorbents;

wherein a time for the exposing another portion of the first gas flow is greater than a time for the exposing the first gas flow, or wherein a time for the exposing another portion of the first gas flow is less than a time for the exposing the first gas flow.

5. The method of claim 1, wherein the first sorbent loading is greater than the second sorbent loading.

6. The method of claim 1, wherein the one or more amine sorbents comprise at least one aminopolymer.

7. The method of claim 6, wherein the one or more amine sorbents have an absolute loading of 3.0 mmol-$CO_2$/g-aminopolymer or less prior to exposing the first gas flow to the one or more amine sorbents.

8. The method of claim 6, wherein the first sorbent loading is 0.2 mmol-$CO_2$/g-aminopolymer or more.

9. The method of claim 6, wherein the first sorbent loading is 0.2 mmol-$CO_2$/g-aminopolymer to 4.5 mmol-$CO_2$/g-aminopolymer.

10. The method of claim 6, wherein the second sorbent loading is 1.0 mmol-$CO_2$/g-aminopolymer to 4.0 mmol-$CO_2$/g-aminopolymer.

11. The method of claim 6, wherein the second sorbent loading is 4.0 mmol-$CO_2$/g-aminopolymer to 7.0 mmol-$CO_2$/g-aminopolymer.

12. The method of claim 1, wherein desorbing at least a portion of the $CO_2$ from the one or more additionally loaded amine sorbents forms one or more regenerated amine sorbents, the method further comprising:

cooling the sorbent environment to a temperature of less than 90° C. and above the temperature of the first gas flow; and exposing another portion of the first gas flow to the one or more regenerated amine sorbents.

13. The method of claim 4, wherein cooling the sorbent environment comprises cooling the sorbent environment to a temperature of less than 70° C.

14. The method of claim 4, the second gas flow comprising a second $O_2$ concentration, wherein during the exposing the second gas flow, a ratio of a time for the sorbent environment to reach a maximum temperature of 80° C. or higher versus a time for the sorbent environment to reach the second $O_2$ concentration is 4.0 or more, the maximum temperature being the highest temperature in the sorbent environment.

15. The method of claim 1, wherein heating the sorbent environment comprises passing the purge gas flow through the sorbent environment, the purge gas flow comprising a temperature of 85° C. or higher.

16. The method of claim 1, wherein the first gas flow comprises air; or wherein the second gas flow comprises at least a portion of a combustion flue gas; or a combination thereof.

17. The method of claim 1, wherein 95 vol % or more of the volume of $CO_2$ in the second gas flow during the exposing the second gas flow is sorbed by the one or more partially loaded amine sorbents.

18. The method of claim 1, the second gas flow comprising at least a portion of a combustion flue gas from a power plant, wherein i) the purge gas flow comprises steam generated by the power plant, ii) at least a portion of the power for performing the method of sorbing $CO_2$ is provided by the power plant, or iii) a combination of i) and ii).

* * * * *